US007903886B2

(12) United States Patent
Inazumi

(10) Patent No.: US 7,903,886 B2
(45) Date of Patent: Mar. 8, 2011

(54) PARTIAL PRECISION COMPRESSION SCHEME FOR TRANSMITTING DATA TO A DISPLAY OVER A LIMITED-BANDWIDTH TRANSMISSION PATH

(75) Inventor: Mitsuhiro Inazumi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 999 days.

(21) Appl. No.: 11/470,376

(22) Filed: Sep. 6, 2006

(65) Prior Publication Data

US 2007/0052736 A1 Mar. 8, 2007

(30) Foreign Application Priority Data

Sep. 8, 2005 (JP) ................................. 2005-260262

(51) Int. Cl.
*G06K 9/36* (2006.01)
*G06T 9/00* (2006.01)
*H04N 11/02* (2006.01)
(52) U.S. Cl. ....... 382/232; 382/233; 345/555; 348/390.1
(58) Field of Classification Search .................. 382/232, 382/233, 238–240, 244–247; 345/555; 348/384.1, 348/390.1, 425.1–425.4; 358/426.01, 426.12, 358/426.13, 426.16; 708/203; 375/240, 375/240.01, 240.02, 240.12, 240.21, 240.23, 375/240.26
See application file for complete search history.

(56) References Cited

U.S. PATENT DOCUMENTS

| 5,771,182 | A | * | 6/1998 | Baker et al. ............... 708/203 |
| 5,867,602 | A | * | 2/1999 | Zandi et al. ................ 382/248 |
| 5,949,911 | A | * | 9/1999 | Chui et al. ................ 382/240 |
| 6,208,761 | B1 | * | 3/2001 | Passaggio et al. .......... 382/237 |
| 6,462,861 | B2 | * | 10/2002 | Ohshima et al. ............ 359/334 |
| 6,463,177 | B1 | * | 10/2002 | Li et al. .................. 382/232 |
| 6,771,828 | B1 | * | 8/2004 | Malvar .................... 382/240 |
| 6,778,709 | B1 | * | 8/2004 | Taubman .................. 382/240 |
| 6,993,199 | B2 | * | 1/2006 | Chebil .................... 382/240 |
| 7,283,589 | B2 | | 10/2007 | Cai et al. |
| 2005/0093869 | A1 | * | 5/2005 | Savekar et al. ............ 345/502 |
| 2005/0193396 | A1 | * | 9/2005 | Stafford-Fraser et al. .... 719/328 |

FOREIGN PATENT DOCUMENTS

| CN | 1466384 A | 1/2004 |
| CN | 1531349 A | 9/2004 |
| JP | A 2004-69996 | 3/2004 |
| JP | A 2004-88194 | 3/2004 |

OTHER PUBLICATIONS

Bhargava et al. (Nov. 2004) "MPEG video encryption algorithms." Multimedia Tools and Applications, vol. 24 No. 1, pp. 57-79.*

* cited by examiner

*Primary Examiner* — Brian P Werner
*Assistant Examiner* — Barry Drennan
(74) *Attorney, Agent, or Firm* — Oliff & Berridge, PLC

(57) ABSTRACT

An image display system includes a data processing device that processes image data, an image display device that displays an image, and a transmission path that transmits data between the data processing device and the image display device. The data processing device generates compensated image data, a partial precision data generating unit divides the compensated image data into a plurality of partial precision data according to precisions, a transmission data judging unit judges whether or not the individual partial precision data are to be transmitted, and a transmitting unit transmits data. The image display device includes a receiving unit, a storage unit, a data synthesizing unit that synthesizes the partial precision data for the individual precisions stored in the storage unit, and an image display unit that displays image data synthesized by the data synthesizing unit.

12 Claims, 14 Drawing Sheets

FIRST PARTIAL PRECISION DATA (AFTER SIGN EXTENSION)    : 0 1 1 1 0 1 1 0 0 0 0 0 0 0
+
SECOND PARTIAL PRECISION DATA (AFTER SIGN EXTENSION)   : 0 0 0 0 0 0 0 0 0 0 0 0 0 0
+
THIRD PARTIAL PRECISION DATA (AFTER SIGN EXTENSION)    : 1 1 1 1 1 1 1 1 1 1 1 1 1 0
=
RESIDUAL (INITIAL VALUE)                               : 0 1 1 1 0 1 0 1 1 1 1 1 1 0

| START-OF-DATA MARKER |
| --- |
| UPDATE HEADER |
| MOST SIGNIFICANT BIT POSITION |
| LEAST SIGNIFICANT BIT POSITION |
| PARTIAL PRECISION DATA |
| END-OF-DATA MARKER |

FIG. 8B

| START-OF-DATA MARKER |
| --- |
| NON-UPDATE HEADER |
| MOST SIGNIFICANT BIT POSITION |
| LEAST SIGNIFICANT BIT POSITION |
| END-OF-DATA MARKER |

FIG. 8C

| START-OF-DATA MARKER |
| --- |
| INITIALIZATION HEADER |
| MOST SIGNIFICANT BIT POSITION |
| LEAST SIGNIFICANT BIT POSITION |
| END-OF-DATA MARKER |

FIG.13A

| START-OF-DATA MARKER |
|---|
| UPDATE HEADER |
| LOW-FREQUENCY DATA POSITION |
| HIGH-FREQUENCY DATA POSITION |
| RESOLUTION POWER X |
| RESOLUTION POWER Y |
| PARTIAL PRECISION DATA |
| END-OF-DATA MARKER |

FIG.13B

| START-OF-DATA MARKER |
|---|
| NON-UPDATE HEADER |
| LOW-FREQUENCY DATA POSITION |
| HIGH-FREQUENCY DATA POSITION |
| RESOLUTION POWER X |
| RESOLUTION POWER Y |
| END-OF-DATA MARKER |

FIG.13C

| START-OF-DATA MARKER |
|---|
| INITIALIZATION HEADER |
| LOW-FREQUENCY DATA POSITION |
| HIGH-FREQUENCY DATA POSITION |
| RESOLUTION POWER X |
| RESOLUTION POWER Y |
| END-OF-DATA MARKER |

FIG.15A

| START-OF-DATA MARKER |
| --- |
| UPDATE HEADER |
| REGION ORIGIN X |
| REGION ORIGIN Y |
| REGION WIDTH |
| REGION HEIGHT |
| MOST SIGNIFICANT BIT POSITION (LOW-FREQUENCY DATA POSITION) |
| LEAST SIGNIFICANT BIT POSITION (HIGH-FREQUENCY DATA POSITION) |
| (RESOLUTION POWER X) |
| (RESOLUTION POWER Y) |
| PARTIAL PRECISION DATA |
| END-OF-DATA MARKER |

FIG.15B

| START-OF-DATA MARKER |
| --- |
| NON-UPDATE HEADER |
| REGION ORIGIN X |
| REGION ORIGIN Y |
| REGION WIDTH |
| REGION HEIGHT |
| MOST SIGNIFICANT BIT POSITION (LOW-FREQUENCY DATA POSITION) |
| LEAST SIGNIFICANT BIT POSITION (HIGH-FREQUENCY DATA POSITION) |
| (RESOLUTION POWER X) |
| (RESOLUTION POWER Y) |
| END-OF-DATA MARKER |

FIG.15C

| START-OF-DATA MARKER |
| --- |
| INITIALIZATION HEADER |
| REGION ORIGIN X |
| REGION ORIGIN Y |
| REGION WIDTH |
| REGION HEIGHT |
| MOST SIGNIFICANT BIT POSITION (LOW-FREQUENCY DATA POSITION) |
| LEAST SIGNIFICANT BIT POSITION (HIGH-FREQUENCY DATA POSITION) |
| (RESOLUTION POWER X) |
| (RESOLUTION POWER Y) |
| END-OF-DATA MARKER |

PARTIAL PRECISION COMPRESSION SCHEME FOR TRANSMITTING DATA TO A DISPLAY OVER A LIMITED-BANDWIDTH TRANSMISSION PATH

BACKGROUND

1. Technical Field

The present invention relates to an image display system, an image display method, and an image display program.

2. Related Art

There is known an image display system including a personal computer (data processing device) that processes image data, a liquid crystal projector (image display device) that displays images on the basis of the image data processed by the personal computer, and a USB (Universal Serial Bus) cable (transmission path) that transmits data between the personal computer and the liquid crystal projector (for example, see JP-A-2004-88194).

In the image display system described in JP-A-2004-88194, the image data for causing the liquid crystal projector to display the images is input to the personal computer, then is compensated by the personal computer, and subsequently is transmitted to the liquid crystal projector through a USB cable. Then, the liquid crystal projector displays image data after a compensation processing (compensated image data) received through the USB cable on a screen.

The compensation processing of the image data in the personal computer includes, for example, an image quality improvement processing or a characteristic compensation processing of the liquid crystal projector. Here, the image quality improvement processing is a processing that is generally called color enhancement, image enhancement, or the like. For example, an increase in the number of bits of data of each color of RGB is accompanied by an increase in the number of representable colors. In general, since the image data is data having 24 bits in total, that is, 8 bits for each color of RGB, about 1678 tens of thousands colors can be represented. With such an image quality improvement processing, the image data may be data having 30 bits in total, that is, 10 bits for each color of RGB, and thus about 1.7 billion colors can be represented. In addition, as the characteristic compensation processing of the liquid crystal projector, for example, a VT compensation processing (where V is a voltage to be applied to a liquid crystal panel in the liquid crystal projector and T is transmittance of the liquid crystal panel) or a γ correction processing may be exemplified. Then, such a characteristic compensation processing is generally accompanied by addition of data to the image data (in general, 24 bits) input to the personal computer, and thus the number of bits of the image data increases.

As described above, due to the compensation processing performed in the personal computer, the number of bits of the image data increases, and thus the amount of data to be transmitted to the liquid crystal projector through the USE cable becomes large. For example, the image data that has 8 bits for each color of RGB, that is, 24 bits in total, when input to the personal computer becomes data having 12 bits for each color of RGB, that is, 36 bits in total, or 16 bits for each color of RGB, that is, 48 bits in total, when transmitted after the compensation processing in the personal computer. As such, in the image display system described in JP-A-2004-88194, the amount of data to be transmitted from the personal computer to the liquid crystal projector through the USB cable becomes large, and the transmission may not be appropriately performed according to the transmission capability of the USB cable. As a result, image quality of the image to be displayed by the liquid crystal projector may be degraded.

SUMMARY

An advantage of some aspects of the invention is that it provides an image display system that can reduce the amount of data to be transmitted from a data processing device to an image display device through a transmission path so as to appropriately perform data transmission, and can prevent degradation of image quality of an image to be displayed by the image display device, an image display method, an image display program, a recording medium, a data processing device, and an image display device.

According to a first aspect of the invention, an image display system includes a data processing device that processes image data, an image display device that displays an image on the basis of the image data processed by the data processing device, and a transmission path that transmits data between the data processing device and the image display device. The data processing device includes an image data processing unit that performs a predetermined compensation processing on the image data so as to generate compensated image data, a partial precision data generating unit that divides the compensated image data into a plurality of partial precision data according to precisions, a transmission data judging unit that judges whether or not the individual partial precision data are to be transmitted, and a transmitting unit that transmits partial precision data judged by the transmission data judging unit as one to be transmitted through the transmission path. The image display device includes a receiving unit that receives the partial precision data transmitted from the transmitting unit through the transmission path, a storage unit that stores the partial precision data received by the receiving unit, a data synthesizing unit that synthesizes the partial precision data for individual precisions stored in the storage unit, and an image display unit that displays image data synthesized by the data synthesizing unit.

In the image display system having the above configuration according to the first aspect of the invention, the data processing device divides the compensated image data after the compensation processing into a plurality of partial precision data according to precisions, and transmits only partial precision data judged as one to be transmitted among the plurality of partial precision data to the image display device through the transmission path. The image display device stores the received partial precision data on a case-by-case basis. Here, the partial precision data is stored for individual precisions, and the image display device synthesizes the stored partial precision data for the individual precisions so as to form image data to be displayed and displays the image on the basis of the image data.

Here, in the data processing device, the judgment whether or not the partial precision data is to be transmitted is performed from a viewpoint of whether or not the transmission of the partial precision data is required for image display in the image display device. Here, it may be judged that the partial precision data is to be not transmitted (when the transmission of the partial precision data is not required for image display in the image display device). For example, when partial precision data that is used for image display at an earlier time and is stored in the image display device already can be used as it is, it is unnecessary to transmit partial precision data according to corresponding precision again.

As described above, in the image display system according to the first aspect of the invention, since the partial precision data judged by the data processing device as one to be not transmitted does not need to be transmitted, the amount of data to be transmitted from the data processing device to the image display device through the transmission path can be reduced, and the transmission can be appropriately performed. Therefore, it is possible to prevent the quality of an image to be displayed by the image display device from being degraded.

In the image display system according to the first aspect of the invention, the transmission data judging unit may compare partial precision data to be judged and corresponding partial precision data at the earlier time, when both are inconsistent with each other, may judge that the partial precision data is to be transmitted, and, when both are consistent with each other, may judge that the partial precision data is to be not transmitted.

According to the image display system having the above configuration, since only the partial precision data that is changed from the corresponding partial precision data at the earlier time may be transmitted, the amount of data to be transmitted from the data processing device to the image display device through the transmission path can be reduced, and the transmission can be appropriately performed. Therefore, it is possible to prevent the quality of an image to be displayed by the image display device from being degraded.

In the image display system according to the first aspect of the invention, the data processing device may include a non-update data setting unit that sets non-update data corresponding to data partial precision data judged by the transmission data judging unit as one to be not transmitted among the plurality of partial precision data generated by the partial precision data generating unit. The transmitting unit may transmit the non-update data through the transmission path, the receiving unit may receive the non-update data transmitted from the transmitting unit through the transmission path, and the storage unit may refer to the non-update data received by the receiving unit so as not to perform update of the partial precision data corresponding to the non-update data stored in the storage unit.

In the image display system having the above configuration, for the partial precision data judged by the data processing device as one to be not transmitted, only the non-update data having a small size purporting that the partial precision data is not to be updated, and the partial precision data having a large size is not transmitted. Therefore, the amount of data to be transmitted from the data processing device to the image display device through the transmission path can be reduced, and the transmission can be appropriately performed. As a result, it is possible to prevent the quality of an image to be displayed by the image display device from being degraded.

In the image display device, the partial precision data corresponding to the non-update data is not updated and used for the synthesis of the image data as it is.

In the image display system according to the first aspect of the invention, the data processing device may include a transmission capability judging unit that judges whether or not partial precision data judged by the transmission data judging unit as one to be transmitted can be actually transmitted through the transmission path. The transmitting unit may transmit partial precision data judged by the transmission capability judging unit as a transmittable one through the transmission path.

In the image display system having the above configuration, with reference to a status of the transmission path (whether or not congestion occurs) a temporal margin to an update timing of an image frame, the amount of data to be transmitted, and the like, the transmission capability judging unit judges whether or not the partial precision data can be transmitted. Then, only the partial precision data judged as a transmittable one is transmitted to the image display device.

According to such an image display system, the maximum partial precision data in an acceptable range can be transmitted to the image display device with reference to an actual status, such as the status of the transmission path or the like, and an image of the maximum precision can be displayed with reference to the actual status.

In the image display system according to the first aspect of the invention, the data processing device may include an initialization data setting unit that sets initialization data corresponding to partial precision data judged by the transmission capability judging unit as a non-transmittable one among the plurality of partial precision data generated by the partial precision data generating unit. The transmitting unit may transmit the initialization data through the transmission path, the receiving unit may receive the initialization data transmitted from the transmitting unit through the transmission path, and the storage unit may refer to the initialization data received by the receiving unit and initialize partial precision data corresponding to the initialization data stored in the storage unit.

In the image display system having the above configuration, for the partial precision data judged by the transmission capability judging unit as a non-transmittable one, the initialization data is set, and only the initialization data is transmitted while the partial precision data is not transmitted. Here, the initialization data is data purporting that the partial precision data is to be initialized and has a small size. Accordingly, there are many cases where the initialization data can be transmitted even though partial precision data (large size) itself cannot be transmitted. Then, corresponding partial precision data stored in the image display device is initialized on the basis of the transmitted initialization data.

Here, the partial precision data judged by the transmission capability judging unit as a non-transmittable one is the partial precision data judged by the transmission data judging unit as one to be transmitted. This partial precision data is data that is to be transmitted to the image display device and to be used for update of partial precision data of corresponding precision at the earlier time stored in the storage unit originally (if transmittable). However, since the partial precision data itself cannot be transmitted according to the actual status, such as the status of the transmission path or the like, in the image display system having the above configuration, only the initialization data is transmitted. According to this configuration, even when the partial precision data cannot be updated, the partial precision data can be initialized. Therefore, it is possible to prevent at least the partial precision data at the earlier time (partial precision data to be originally updated to newly transmitted partial precision data) from being used for synthesis of image data, and to precision of the image from deteriorating.

In the image display system according to the first aspect of the invention, the partial precision data generating unit may divide the compensated image data into one main partial precision data that can represent a main portion in the image, and at least one detailed partial precision data that is generated on the basis differential data obtained by subtracting the main partial precision data from the compensated image data and is synthesized with the main partial precision data so as to represent a detailed portion in the image. The transmission capability judging unit may preferentially judge the main partial precision data than the detailed partial precision data as a transmittable one among the plurality of partial precision data generated by the partial precision data generating unit.

According to the image display system having the above configuration, the main partial precision data that can represent the main portion in the image is preferentially transmitted to the image display device, and at least the main portion can be displayed on the image display device. Therefore, the minimum image precision can be verified.

In the image display system according to the first aspect of the invention, the main partial precision data may be generated as data of a predetermined number of bits from a most significant bit in the compensated image data expressed by bits.

For example, the main partial precision data may be generated as data of 8 bits from the most significant bit (MSB) in the 12-bit compensated image data.

In the image display system according to the first aspect of the invention, the main partial precision data may be generated on the basis of individual pictures included in a GOP structure in the compensated image data encrypted by an MPEG system.

Here, MPEG is one of image compression systems and is an abbreviation of Moving Picture Experts Group. Further, the GOP is a group of pictures as a unit of image compression in MPEG and is an abbreviation of Group Of Pictures.

The pictures constituting the GOP include an I (Intra) picture, a P (Predictive) picture, and a B (Bi-directional predictive) picture. Here, the I picture is a picture that can be self-reproduced, the P picture is a picture that can be reproduced with reference to a picture at the earlier time, and the B picture is a picture that can be reproduced with reference to pictures at the earlier time and later time. As such, in the GOP structure, since the reference relationship between the pictures is set, the pictures included in the same GOP structure have many similar and common portions. Here, since the similar and common portions between the pictures constitute the main portions in a series of pictures (images) expressed in the GOP, like the above configuration, it is reasonable and easy to generate the main partial precision data on the basis of the pictures included in the GOP structure. As such, when the main partial precision data having high commonality among the pictures included in the GOP structure is set, the size of the detailed partial precision data generated by subtracting the main partial precision data from the image data can be reduced. Therefore, the amount of data to be transmitted through the transmission path can be reduced.

As the main partial precision data, for example, average data of the pictures included in the GOP structure may be used but is not intended to limit the invention.

In the image display system according to the first aspect of the invention, the main partial precision data may be generated as a normal component among individual spatial frequency components obtained by performing spatial frequency transform on the compensated image data.

Here, the spatial frequency transform transforms the image data into the individual spatial frequency components, and, for example, DCT (Discrete Cosine Transform), Fourier transform, Hadamard transform, and wavelet transform may be exemplified. According to the aspect of the invention, since the normal component having the minimum variation among the spatial frequency components generated by performing the spatial frequency transform on the compensated image data is set to the main partial precision data. Therefore, the main partial precision data having high reusability can be obtained. As a result, the amount of data to be transmitted through the transmission path can be reduced.

In the image display system according to the first aspect of the invention, the data processing device may include a partial region dividing unit that divides the compensated image data into a plurality of partial regions. The processing in the data processing device and the image display device may be performed for each partial region.

The image display system having the above configuration is particularly suitable for a processing of the compensated image data including a partial region having a small temporal change. That is, since a temporal change of the partial precision data is also small in the partial region having a small temporal change, reusability of the partial precision data is increased. For this reason, the number of transmission times of update partial precision data to the image display device can be reduced, and thus the amount of data to be transmitted through the transmission path can be reduced.

According to a second aspect of the invention, there is provided an image display method using an image display system including a data processing device that processes image data, an image display device that displays an image on the basis of the image data processed by the data processing device, and a transmission path that transmits data between the data processing device and the image display device. The data processing device executes performing a predetermined compensation processing on the image data so as to generate compensated image data, dividing the compensated image data into a plurality of partial precision data according to precisions, judging whether or not the individual partial precision data is to be transmitted, and transmitting partial precision data judged in the judging as one to be transmitted through the transmission path. The image display device executes receiving the partial precision data transmitted through the transmission path in the transmitting, storing the partial precision data received in the receiving, synthesizing partial precision data for the individual precisions stored in the storing, and displaying image data synthesized in the synthesizing.

The image display method having the above configuration is executed by the above-described image display system according to the first aspect of the invention, and thus the above-described effects and advantages of the image display system according to the first aspect of the invention can be achieved.

There is provided an image display program using an image display system including a data processing device that processes image data, an image display device that displays an image on the basis of the image data processed by the data processing device, and a transmission path that transmits data between the data processing device and the image display device. The image display program causes a computer provided in the data processing device to execute performing a predetermined compensation processing on the image data so as to generate compensated image data, dividing the compensated image data into a plurality of partial precision data according to precisions, judging whether or not the individual partial precision data is to be transmitted, and transmitting partial precision data judged in the judging as one to be transmitted through the transmission path, and causes a computer provided in the image display device to execute receiving the partial precision data transmitted in the transmitting through the transmission path, storing the partial precision data received in the receiving, synthesizing the partial precision data for the individual precisions stored in the storing, and displaying image data synthesized in the synthesizing.

According to a third aspect of the invention, there is provided a computer-readable recording medium having recorded thereon the image display program.

The image display program and the recording medium having the above configuration is used to execute the above-described image display method according to the second aspect of the invention, and thus the above-described effects and advantages of the image display method according to the second aspect of the invention can be achieved.

According to a fourth aspect of the invention, a data processing device includes an image data processing unit that performs a predetermined compensation processing on image data so as to generate compensated image data, a partial precision data generating unit that divides the compensated image data into a plurality of partial precision data according to precisions, a transmission data judging unit that judges whether or not the individual partial precision data is to be transmitted, and a transmitting unit that transmits partial precision data judged by the transmission data judging unit as one to be transmitted through the transmission path.

There is provided an image display device connected to a data processing device, which performs a predetermined compensation processing on image data so as to generate compensated image data, divides the compensated image data into a plurality of partial precision data according to precisions, and transmits individual partial precision data, through a transmission path. The image display device includes a receiving unit that receives the partial precision data transmitted from the data processing device through the transmission path, a storage unit that stores the partial precision data received by the receiving unit, a data synthesizing unit that synthesizes the partial precision data for the individual precisions stored in the storage unit, an image display unit that displays image data synthesized by the data synthesizing unit.

The data processing device and the image display device having the above configuration constitute the above-described image display system according to the first aspect of the invention, and thus the above-described effects and advantages of the image display system according to the first aspect of the invention can be achieved.

BRIEF DESCRIPTION OF THE DRAWINGS

The invention will be described with reference to the accompanying drawings, wherein like numbers reference like elements.

FIG. 7 is a diagram showing synthesis of partial precision data shown in FIG. 4.

FIGS. 8A to 8C are diagrams showing data to be transmitted from a personal computer to a liquid crystal projector in the image display system according to the first embodiment of the invention.

FIGS. 13A to 13C are diagrams showing data to be transmitted from a personal computer to a liquid crystal projector through a USE cable the image display system according to the third embodiment of the invention.

FIGS. 15A to 15C are diagrams showing data to be transmitted from a personal computer to a liquid crystal projector through a USB cable in the image display system according to the fourth embodiment of the invention.

DESCRIPTION OF EXEMPLARY EMBODIMENTS

Embodiments of the invention will now be described with reference to the drawings.

First Embodiment

Figure 1:
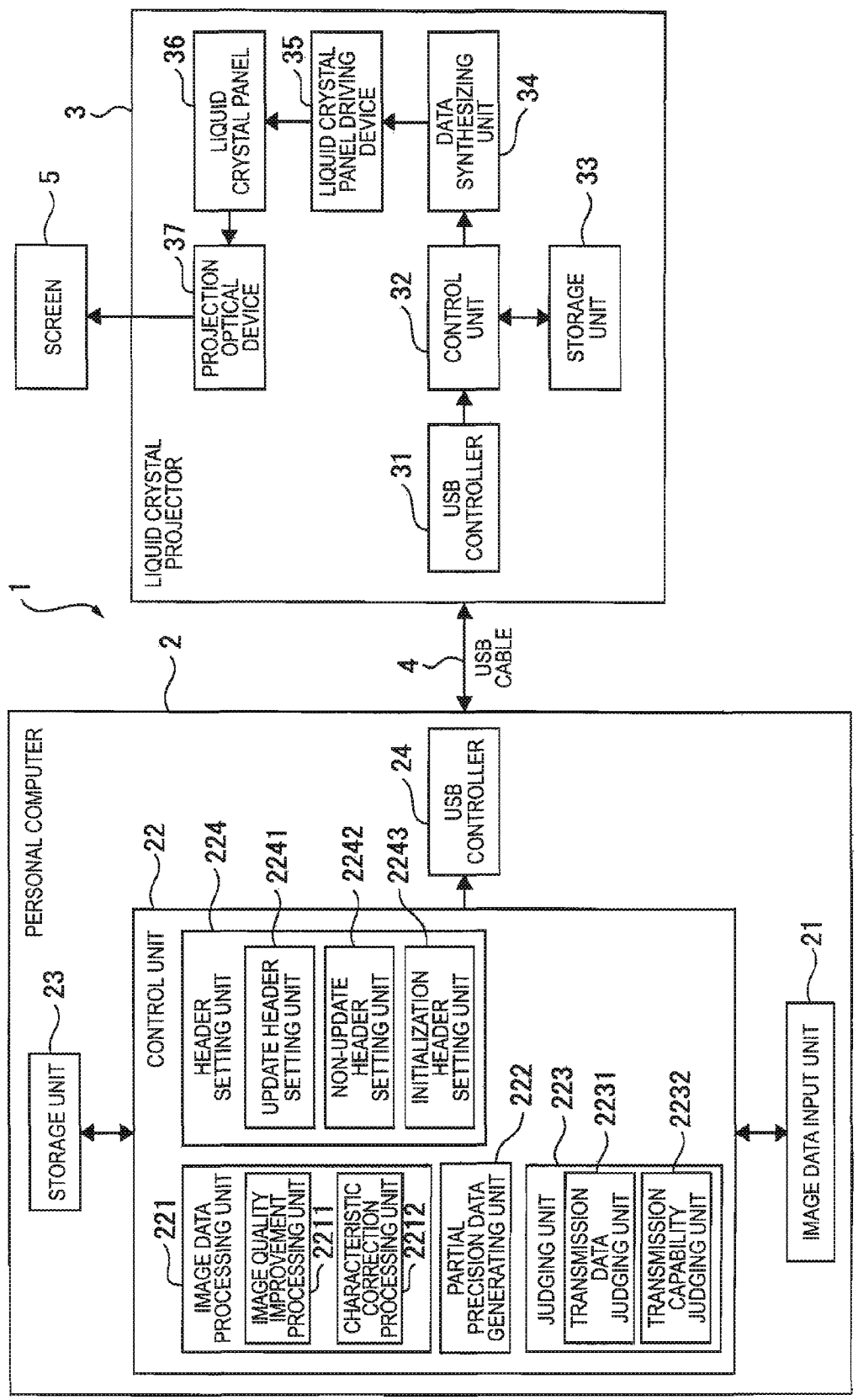
FIG. 1 is a functional block diagram showing the configuration of an image display system according to a first embodiment of the invention.

FIG. 1 is a functional block diagram showing the configuration of an image display system 1 according to a first embodiment of the invention.

1. Overall Configuration of Image Display System

The image display system 1 includes a personal computer 2 serving as a data processing device that processes image data, a liquid crystal projector 3 serving as an image display device that displays an image on the basis of the image data processed by the personal computer 2, and a USB cable 4 serving as a transmission path that transmits data between the personal computer 2 and the liquid crystal projector 3.

2. Configuration of Personal Computer

The personal computer 2 includes an image data input unit 21, a control unit 22, a storage unit 23, and a USB controller 24 serving as communication unit.

The image data input unit 21 is a unit that inputs image data to be finally displayed by the liquid crystal projector 3 to the control unit 22. In this embodiment, it is assumed that the image data is data having 8 bits for each color of RGB, that is, 24 bits in total. Moreover, the image data may be generated in the personal computer 2 or may be supplied from the outside of the personal computer 2 (image data supplied through Internet, image data supplied from an external image data output device (not shown), such as a VT R deck or a DVD player, or image data on electrical waves received a tuner (not shown) provided in the personal computer 2). Further, the image data may be either still image data or motion image data.

The control unit 22 is a unit that performs an overall control on a processing of image data input through the image data input unit 21, and functionally includes an image data processing unit 221, a partial precision data generating unit 222, a judging unit 223, and a header setting unit 224.

The image data processing unit 221 is a unit that performs a general compensation processing on the image data input through the image data input unit 21 so as to generate compensated image data, and includes an image quality improvement processing unit 2211 and a characteristic compensation processing unit 2212.

As described above, the image quality improvement processing unit 2211 performs an image quality improvement processing, which is generally called color enhancement or image enhancement, on the image data. With this processing, for example, the number of bits of the image data that originally has 24 bits can be increased (for example, 30 bits), and thus the number of representable colors can be increased.

The characteristic compensation processing unit 2212 performs a characteristic compensation processing of the liquid crystal projector 3, such as a VT compensation processing or a γ correction processing, on the basis of characteristic compensation data of the liquid crystal projector 3 stored in the storage unit 23. Moreover, such a characteristic compensation processing is accompanied by addition of data to the image data (originally 24 bits), and thus the number of bits of the image data increases.

In this embodiment, it is assumed that the image data having 8 bits for each color of RGB becomes the compensated image data having 12 bits for each color of RGB through the compensation processing in the image data processing unit 221. In the following description, the number of bits of the compensated image data is expressed as the number of bits for each color of RGB unless particularly defined. That is, in the following description, 'compensated image data having 12 bits for each color of RGB, that is, 36 bits in total' is expressed as '12-bit compensated image data'.

The partial precision data generating unit 222 divides the 12-bit compensated image data generated through the compensation processing by the image data processing unit 221 into a plurality of partial precision data according to precisions. For example, the partial precision data generating unit 222 divides the 12-bit compensated image data into 8-bit, 4-bit, and 4-bit partial precision data, that is, three partial precision data in total. Moreover, the details of the generation of the partial precision data will be described below.

The judging unit 223 is a unit that judges whether or not to transmit the individual partial precision data generated by the partial precision data generating unit 222 to the liquid crystal projector 3, and includes a transmission data judging unit 2231 and a transmission capability judging unit 2232.

The transmission data judging unit 2231 is a unit that judges whether or not the individual partial precision data generated by the partial precision data generating unit 222 is to be transmitted. Here, whether or not the partial precision data to be judged is to be transmitted is judged on the basis of the comparison to partial precision data of corresponding precision transmitted to the liquid crystal projector 3 at an earlier time. Specifically, the transmission data judging unit 2231 judges that the partial precision data is to be transmitted when both are inconsistent with each other, and judges that the partial precision data is to be not transmitted when both are consistent with each other. Moreover, the partial precision data transmitted to the liquid crystal projector 3 at the earlier time is stored in the storage unit 23 so as to be used for the judgment by the transmission data judging unit 2231.

The transmission capability judging unit 2232 is a unit that judges whether or not partial precision data judged by the transmission data judging unit 2231 as one to be transmitted can be actually transmitted through the USB cable 4. Specifically, the transmission capability judging unit 2232 judges transmission capability of the partial precision data with reference to the status of the USB cable 4 (whether or not congestion occurs), a temporal margin to an update timing of an image frame, the amount of data to be transmitted, and the like.

The header setting unit 224 is a unit that sets a header in the precision data on the basis of the judgment result of the judging unit 223, and includes an update header setting unit 2241 serving as an update data setting unit, a non-update header setting unit 2242 serving as a non-update data setting unit, and an initialization header setting unit 2243 serving as an initialization data setting unit.

The update header setting unit 2241 is a unit that sets an update header as update data on partial precision data judged by the transmission data judging unit 2231 as one to be transmitted and judged by the transmission capability judging unit 2232 as a transmittable one. Moreover, the details of the update header will be described below.

The non-update header setting unit 2242 is a unit that sets a non-update header as non-update data on partial precision data judged by the transmission data judging unit 2231 as one to be not transmitted. Moreover, the details of the non-update header will be described below.

The initialization header setting unit 2243 is a unit that sets an initialization header as initialization data on partial precision data judged by the transmission data judging unit 2231 as one to be transmitted but judged by the transmission capability judging unit 2232 as a non-transmittable one. Moreover, the details of the initialization header will be described below.

The storage unit 23 is a unit that stores various kinds of data required for processing the image data in the control unit 22. Specifically, the storage unit 23 stores characteristic compensation data of the liquid crystal projector 3 used for the characteristic compensation processing in the characteristic compensation processing unit 2212, partial precision data transmitted to the liquid crystal projector 3 at the earlier time used for the judgment in the transmission data judging unit 2231.

The USB controller 24 is a unit that communicates with the liquid crystal projector 3 through the USB cable 4, and in particular, constitutes a transmitting unit from the relationship with the invention.

The USB controller 24 is configured to transmit the partial precision data and header according to a header set by the header setting unit 224 under the control of the control unit 22. Specifically, for partial precision data having set therein the update header, the USB controller 24 transmits the partial precision data together with the update header. Further, for partial precision data having set therein the non-update header, the USB controller 24 transmits only the non-update header, not the partial precision data. In addition, for partial precision data having set therein the initialization header, the USB controller 24 transmits only the initialization header, not the partial precision data.

Moreover, the USB controller 24 may receive data from the liquid crystal projector 3 through the USB cable 4. As the data received by the USB controller 24, for example, the characteristic compensation data of the liquid crystal projector 3 may be exemplified. The characteristic compensation data is data peculiar to the liquid crystal projector 3. Accordingly, the characteristic compensation data is generally stored in the liquid crystal projector 3 and thus the characteristic compensation data may be received by the USB controller 24 from the liquid crystal projector 3 through the USB cable 4. Then, the characteristic compensation data received by the USB controller 24 is stored by the storage unit 23 and then is used for the characteristic compensation processing in the characteristic compensation processing unit 2212. Moreover, the characteristic compensation data is data peculiar to the liquid crystal projector 3 and does not temporally change. Accordingly, once the characteristic compensation data is stored by the storage unit 23, insofar as the same liquid crystal projector 3 is used, it is unnecessary to retransmit the characteristic compensation data from the liquid crystal projector 3 to the personal computer 2.

3. Configuration of Liquid Crystal Projector

The liquid crystal projector 3 includes a USB controller 31 serving as a communication unit, a control unit 32, a storage unit 33, a data synthesizing unit 34, a liquid crystal panel driving device 35, a liquid crystal panel 36 serving as an image display unit, and a projection optical device 37.

The USB controller 31 is a unit that communicates with the personal computer 2 through the USB cable 4, and has the same configuration as the USB controller 24 in the personal computer 2. In particular, the USB controller 31 constitutes a receiving unit from the relationship with the invention.

The USE controller 31 is configured to receive data transmitted from the personal computer 2 through the USB cable 4. Further, the USE controller 31 may transmit data (for example, the characteristic compensation data of the liquid crystal projector 3) to the personal computer 2 through the USE cable 4.

The control unit 32 is a unit that performs an overall control of the liquid crystal projector 3. In particular, the control unit 32 performs update/non-update/initialization of data stored in the storage unit 33 according to the data received by the USB controller 31 (update header+partial precision data/non-update header only/Initialization header only). Specifically, when the data received by the USB controller 31 is 'update header+partial precision data', the control unit 32 refers to the update header and updates partial precision data of corresponding precision stored in the storage unit 33 by the received partial precision data. When the data received by the USB controller 31 is 'non-update header only', the control unit 32 refers to the non-update header and does not update partial precision data of corresponding precision stored in the storage unit 33. In addition, when the data received by the USB controller 31 is 'initialization header only', the control unit 32 refers to the initialization header and initializes partial precision data of corresponding precision stored in the storage unit 33.

The storage unit 33 is a unit that stores various kinds of data. In particular, the storage unit 33 stores partial precision data received by the USB controller 31 under the control of the control unit 32. Here, partial precision data is individually stored for each precision. Further, as described above, the partial precision data stored in the storage unit 33 is updated/non-updated/initialized according to the kind of the header received by the USB controller 31 (update/non-update/initialization) under the control of the control unit 32. Moreover, the storage unit 33 also stores the characteristic compensation data of the liquid crystal projector 3 (described above) and the like.

The data synthesizing unit 34 is a unit that synthesizes the partial precision data for the individual precisions stored in the storage unit 33. Here, the partial precision data is data that is divided and generated from the compensated image data by the partial precision data generating unit 222 in the personal computer 2. Then, the partial precision data for the individual precisions are synthesized by the data synthesizing unit 34, and thus the compensated image data divided by the partial precision data generating unit 222 is reconstituted.

The liquid crystal panel driving device 35 drives the liquid crystal panel 36 on the basis of image data synthesized by the data synthesizing unit 34, and causes the liquid crystal panel 36 to display an image based on the image data. Moreover, though not shown in detail, three liquid crystal panel 36 in total are provided for the individual colors of RGB.

Then, images for the individual colors of RGB displayed by the three liquid crystal panel 36 are synthesized by a color synthesis optical element, such as a cross dichroic prism or the like, in the projection optical device 37, and then is projected on a screen 5 on a magnified scale by a magnification optical element, such as a projection lens or the like.

4. Image Display Operation in Image Display System

An image display operation in the image display system 1 having the above configuration will now be described in detail.

Figure 2:
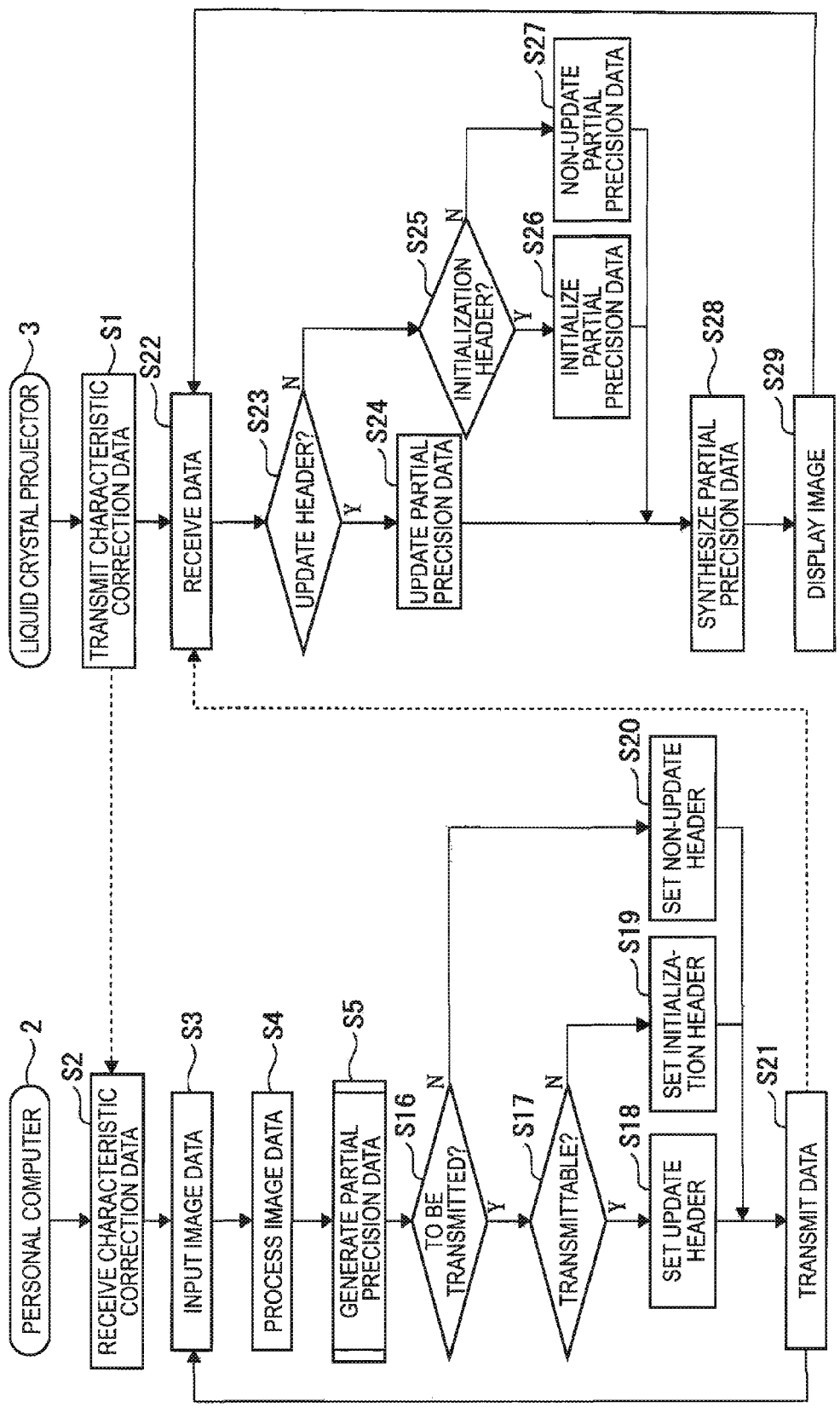
FIG. 2 is a flowchart showing a flow of image display in the image display system according to the first embodiment of the invention.

FIG. 2 is a flowchart showing a flow of image display in the image display system 1.

At a characteristic compensation data transmitting step S1 (symbol S represents Step), the USE controller 31 of the liquid crystal projector 3 transmits the characteristic compensation data of the liquid crystal projector 3 previously stored in the storage unit 33 through the USB cable 4 under the control of the control unit 32.

At characteristic compensation data receiving step S2, the USE controller 24 of the personal computer 2 receives the characteristic compensation data transmitted through the USE cable 4. The received characteristic compensation data is stored in the storage unit 23 under the control of the control unit 22.

At an image data input step S3, the image data input unit 21 inputs the image data to the control unit 2.

At an image data processing step S4, the image data processing unit 221 performs a general compensation processing on the image data input at Step S3. Specifically, as described above, the image quality improvement processing unit 2211 performs the image quality improvement processing on the image data, and the characteristic compensation processing unit 2212 performs the characteristic compensation processing of the liquid crystal projector 3 on the basis of the characteristic compensation data stored in the storage unit 23 at Step S2. As described above, through the compensation processing at Step S4, the number of bits of the image data increases from 8 bits to 12 bits.

At a partial precision data generating step S5, the partial precision data generating unit 222 generates a plurality of partial precision data from the 12-bit compensated image data generated at Step S4.

Figure 3:
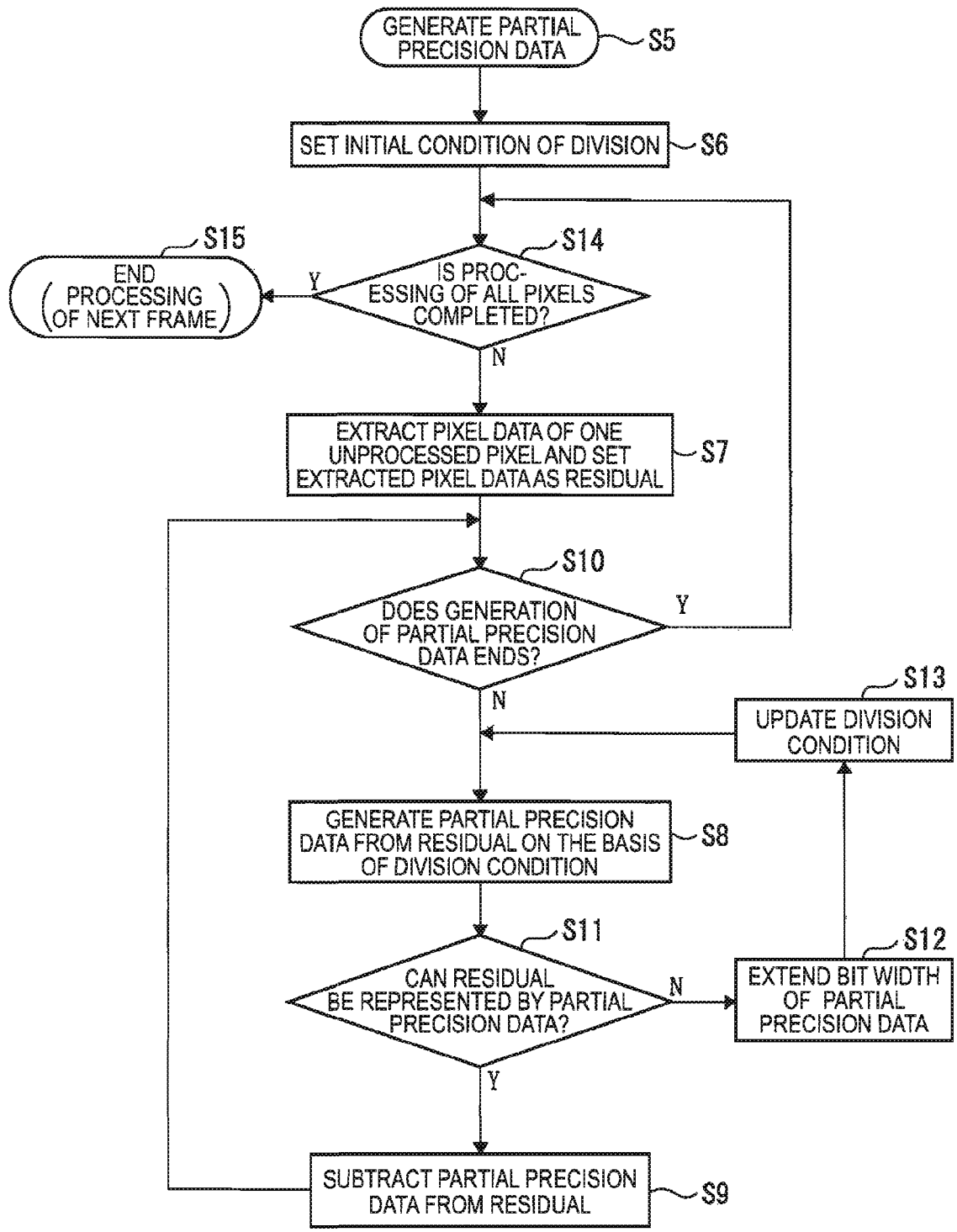
FIG. 3 is a flowchart showing a flow of partial precision data generation in the image display system according to the first embodiment of the invention.

FIG. 3 is a flowchart showing a flow of a processing that is performed by the partial precision data generating unit 222 at the partial precision data generating step S5.

At Step S6, an initial condition of division when the 12-bit compensated image data is divided so as to generate a plurality of partial precision data is set. Specifically, the initial condition of division is set by a group (P, W) of a bit position P where division starts and a division bit width W. As described below in detail, under the condition (P, W), partial precision data of W bits from the division start bit position P is generated. Moreover, a plurality of groups (P, W) may be set. Hereinafter, in this embodiment, the description will be given by way of an example where, as the initial condition, (P, W)=(4, 8), (2, 4), and (0, 4) are set.

Moreover, for convenience of explanation, the division start bit position P may be expressed by an integer in a range of 0 to 11 in the 12-bit compensated image data when the position of a least significant bit (LSB) is '0' and the position of a most significant bit (MSB) is '11'.

At Step S7, the partial precision data generating unit 222 extracts one unprocessed pixel, in which the generation of the partial precision data is not completed, among pixels of the liquid crystal panel 36 in the liquid crystal projector 3. Then, 12-bit compensated image data (hereinafter, referred to as pixel data) that is input to the extracted pixel is set as a residual.

Hereinafter, in this embodiment, the description will be given by way of an example where 12-bit pixel data set as the residual at Step S7 is '011101011110'.

At Step S8, the partial precision data generating unit 222 generates first partial precision data from the residual '011101011110' set at Step S7 on the basis of the first division condition (P, W)=(4, 8) among the division conditions (the initial condition set at Step S6) (P, W)=(4, 8), (2, 4), and (0, 4). Hereinafter, in this example, the generation of the partial precision data by the simplest method will be described. Moreover, as described below, in this embodiment, the generation of the partial precision data by other methods may be performed.

Figure 4:
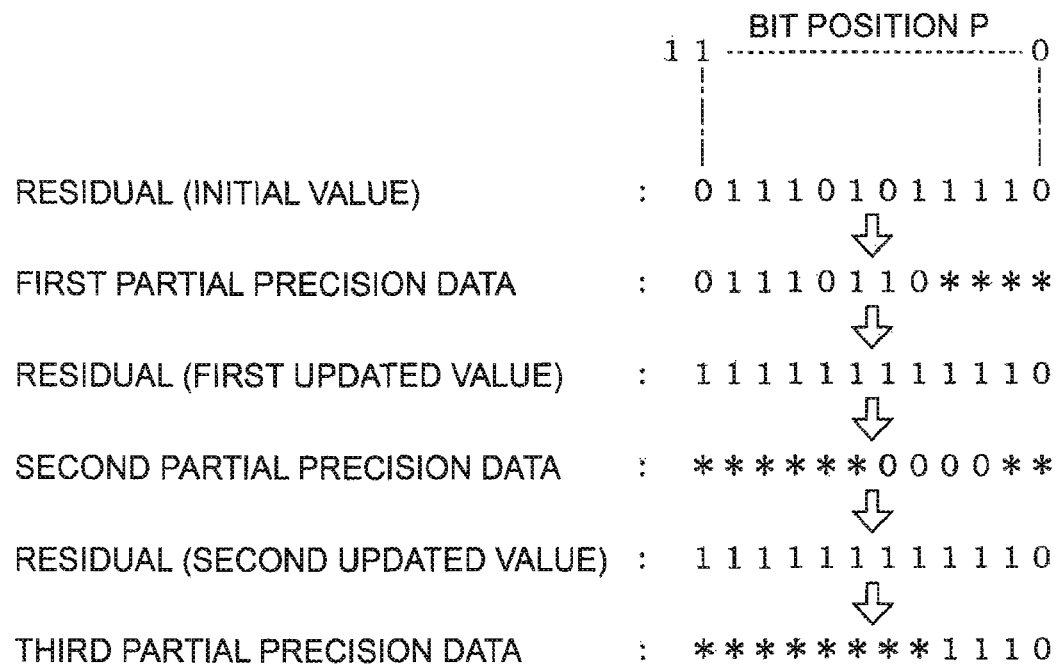
FIG. 4 is a diagram showing a flow of partial precision data generation in the image display system according to the first embodiment of the invention.

In the simplest method, as shown in FIG. 4, a processing of rounding the numerical value (=1) of the bit position P=3 (a processing of performing rounding-down if the numerical value is 0 and rounding-up if the numerical value is 1. This corresponds to rounding-off in a decimal number. Hereinafter, it is referred to as a rounding processing) is performed, and then data of W=8 bits from the bit position P=4 of the residual (initial value) is generated as the first partial precision data '01110110****'. Here, the first partial precision data is data of 8 bits from the MSB of the 12-bit pixel data, and is main partial precision data, which can represent a main portion of an image, in the invention.

At Step S9, (for the first partial precision data, Steps S11 to S13 are not performed), the partial precision data generating unit 222 subtracts the first partial precision data from the residual (initial value). Accordingly, as shown in FIG. 4, the residual is updated to '111111111110' (first updated value).

Subsequently, at Step S10, until it is judged that the generation of all partial precision data (in this embodiment, three partial precision data) are completed (Yes), Steps S8 and S9 are repeatedly performed.

At Step S8 the second time, the partial precision data generating unit 222 generates second partial precision data from the residual '111111111110' updated at Step S9 the previous time on the basis of the next division condition (P, W)=(2, 4).

Specifically, as shown in FIG. 4, a processing of rounding the numerical value (=1) of the bit position P=1 is performed, and then data of W=4 bits from the bit position P=2 of the residual (first updated value) is generated as the second partial precision data '***0000'.

Here, the second partial precision data is detailed partial precision data in the invention that is generated on the basis of the residual (first updated value) as differential data that is obtained by subtracting the first partial precision data as the main partial precision data from the 12-bit residual (initial value) as the image data, and then is synthesized with the first partial precision data as the main partial precision data so as to represent a detailed portion of the image (the same is also applied to third partial precision data described below).

Subsequently, at Step S11, the partial precision data generating unit 222 judges whether or not the residual (first updated value) is representable by the second partial precision data. Here, the term 'representable' means that the partial precision data and the residual are substantially consistent with each other and the residual can be represented (reproduced) by the partial precision data. Specifically, it means that the partial precision data subject to sign extension is consistent with the residual (in the example of FIG. 4, one after the rounding processing). Moreover, the sign extension means that the bit range of data extends by copying the numerical value of the MSB (negative when 1 and positive when 0) representing a sign in data to be represented in a 2's complement.

As described below, the compensated image data is divided into a plurality of partial precision data and is transmitted from the personal computer 2 to the liquid crystal projector 3, and the partial precision data for the individual precisions are synthesized by the liquid crystal projector 3, such that the original compensated image data is reproduced. However, if the partial precision data cannot represent the residual as the source of the partial precision data, even though the partial precision data are synthesized, the original compensated image data (residual) cannot be reproduced. Accordingly, at Step S11, it is judged whether or not the partial precision data generated at Step S8 residual can be reproduced.

Figure 5:
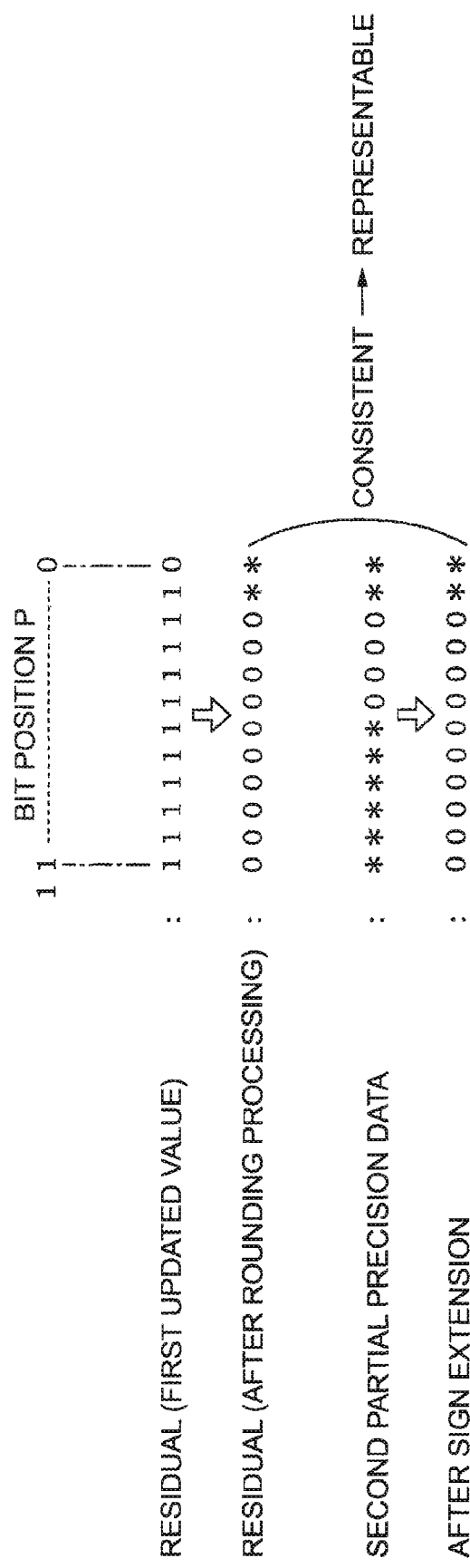
FIG. 5 is a diagram showing an example where a residual can be represented by partial precision data, in the image display system according to the first embodiment of the invention.

Specifically, as shown in FIG. 5, the residual after the rounding processing and the second partial precision data after the sign extension are compared with each other. In the example of FIG. 5, since both are consistent with each other, at Step S11, it is judged that the residual can be represented by the partial precision data (Yes), and then the process progresses to Step S9.

Here, a case where the residual cannot be represented by the partial precision data (Step S11: No) will be described by way of an additional example.

Figure 6:
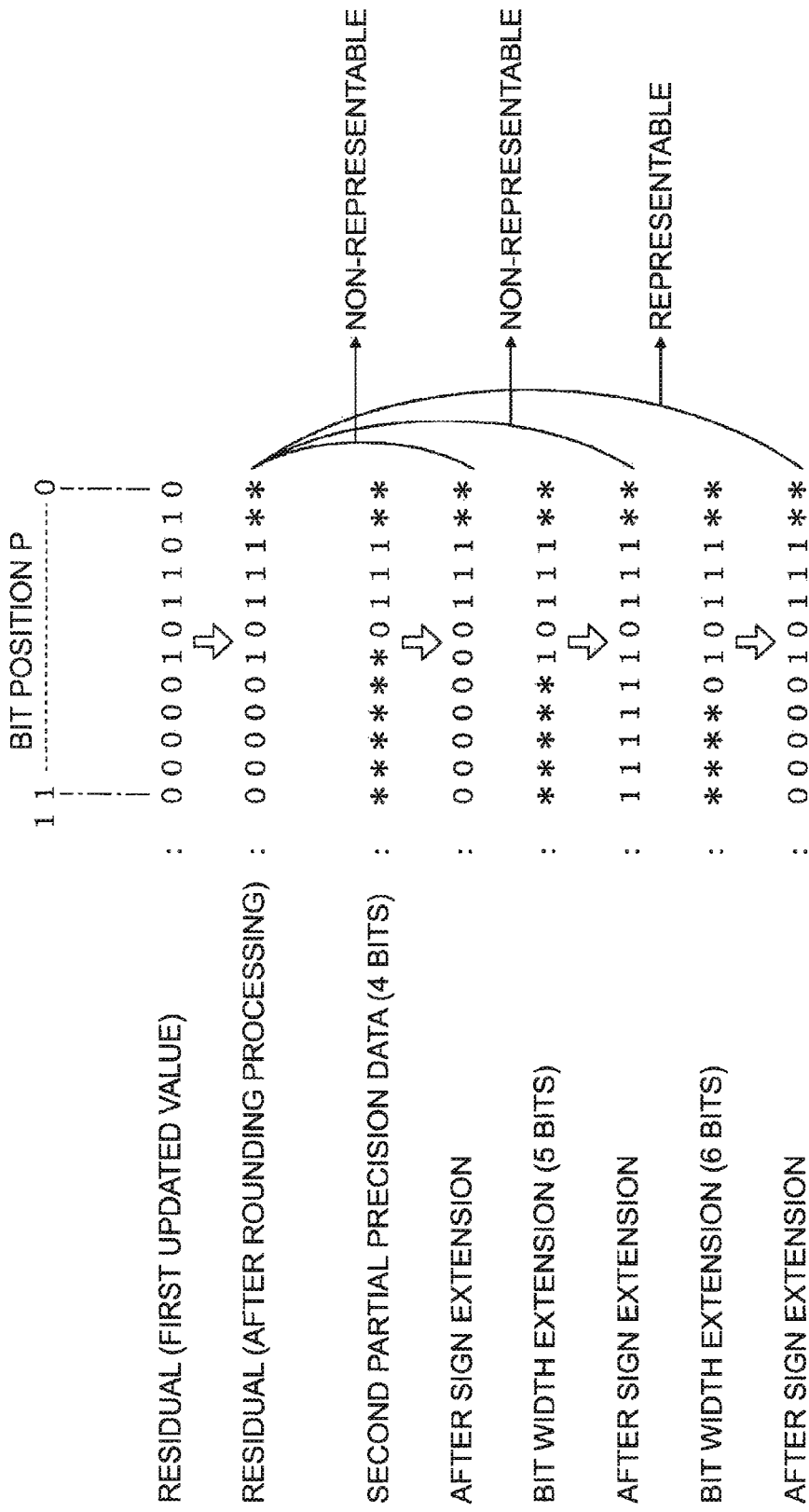
FIG. 6 is a diagram showing an example where a bit width of partial precision data is expanded until a residual can be represented, in the image display system according to the first embodiment of the invention.

In the example shown in FIG. 6, the residual cannot be represented by 4-bit (second) partial precision data (Step S11: No), and, at Step S12, the bit width of the partial precision data extends.

First, the bit width of the partial precision data extends to 5 bits, and the division condition is updated accordingly (Step S13). Subsequently, at Step S8, on the basis of the division condition (the bit width of 5 bits) updated at Step S13, 5-bit partial precision data is generated. Specifically, data of 5 bits from the residual after the rounding processing is reset as the partial precision data. Then, at Step S11, 5-bit partial precision data subject to the sign extension is compared with the residual after the rounding processing, but both are inconsistent with each other, and thus the residual cannot be represented by the partial precision data (No).

Accordingly, the bit width of the partial precision data further extends to 6 bits (Step S12), and the division condition is updated accordingly (Step S13). Then, 6-bit partial precision data generated on the basis of the division condition (Step S8) subject to the sign extension and the residual are consistent with each other and the residual can be represented by the partial precision data (Step S11: Yes). Subsequently, the process progresses to Step S9.

As such, when the residual cannot be represented by the partial precision data (Step S11: No), the bit width of the partial precision data extends until the residual can be represented (Step S12), and the division condition is updated accordingly (Step S13). Here, at Step S13, if the division condition is updated, in the processing for subsequent image frames, instead of the initial condition of division set at Step S6, the division condition updated at Step S13 is used.

Returning to the example of FIG. 4, the description will be continued.

At Step S8 the second time, if the second partial precision data is generated, the process passes through Step S11 (Yes) and progresses to Step S9, such that the residual is updated (second updated value), as shown in FIG. 4.

Next, at Step S8 the third time, the partial precision data generating unit 222 generates third partial precision data from the updated residual '111111111110' on the next division condition (P, W)=(0, 4).

Specifically, as shown in FIG. 4, data of W=4 bits from the bit position P=0 of the residual (second updated value) is generated as the third partial precision data '********1110'. Though not described, the third partial precision data can represent the residual (second updated value) (Step S11: Yes).

As described above, if the generation of three partial precision data is completed (Step S10: Yes), Steps S7 to S14 are repeatedly performed until it is judged at Step S14 that the processing of all pixels of the liquid crystal panel 36 is completed (Yes). Then, if the processing of all pixels is completed (Step S14: Yes), and the processing for one image frame is completed, a processing for a next image frame is performed (Step S15).

As described above, through the partial precision data generating step S5 shown in FIG. 3, for the pixel data (12 bits) of all pixels of the liquid crystal panel 36, three partial precision data are generated.

In particular, 8-bit first partial precision data '01110110**', 4-bit second partial precision data '**0000', and 4-bit third partial precision data '********1110' are generated from the 12-bit pixel data '011101111110' shown in the example in FIG. 4. As described below, these partial precision data are transmitted to the liquid crystal projector 3, and are synthesized by the liquid crystal projector 3 so as to represent the original pixel data. Here, the synthesis is performed by performing the sign extension of the first, second, and third partial precision data (copying the numerical value of the MSB representing the sign to the '*' places in FIG. 4 or the like) and adding them. FIG. 7 shows an example of the synthesis corresponding to the example of FIG. 4. From FIG. 4, it can be seen that, with the synthesis, the initial value of the residual, that is, the original pixel data is reproduced.

Subsequently, returning to FIG. 2, a flow of image display at Step S5 and later will be described.

At Step S16, the transmission data judging unit 2231 judges whether or not the individual partial precision data generated at Step S5 are to be transmitted. As described above, the transmission data judging unit 2231 performs the judgment on the basis of the comparison with the partial precision data of corresponding precision transmitted to the liquid crystal projector 3 at the earlier time, when both are inconsistent with each other, judges that the partial precision data to be judged is to be transmitted, and, when both are consistent with each other, judges that the partial precision data to be judged is to be not transmitted.

At Step S17, the transmission capability judging unit 2232 refers to the status of the USB cable 4 (whether or not congestion occurs), a temporal margin to an update timing of an image frame, the amount of data to be transmitted, and the like, and, for the partial precision data judged at Step S16 as one to be transmitted (Yes), comprehensively judges whether or not the partial precision data can be actually transmitted through the USB cable 4. Here, the transmission capability nudging unit 2232 preferentially judges the first partial precision data as the main partial precision data among the first to third partial precision data generated by the partial precision data generating unit 222, and then performs the judgment on the second partial precision data and the third partial precision data in that order. Accordingly, for example, wren only one of the first to third partial precision data can be transmitted, the first partial precision data is judged as a transmittable one, and the second and third partial precision data are judged as a non-transmittable one.

At Step S18, the update header setting unit 2241 sets the update header for the partial precision data judged at Step S17 as a transmittable one (Yes).

At Step S19, the initialization header setting unit 2243 sets the initialization header for the partial precision data judged at Step S17 as a non-transmittable one (No).

At Step S20, the non-update header setting unit 2242 sets the non-update header for the partial precision data judged at Step S16 as one to be transmitted (No).

At Step S21, the USB controller 24 transmits data to the liquid crystal projector 3 through the USB cable 4 under the control of the control unit 22. Here, the data to be transmitted are different from the headers for the partial precision data at Steps S18 to S20.

FIGS. 8A to 8C show data to be transmitted. Specifically, FIG. 8A shows transmission data when the update header is set at Step S18, FIG. 8B shows transmission data when the non-update header is set at Step S20, and FIG. 8C shows transmission data when the initialization header is set at Step S19. As shown by a solid frame in FIG. 8A, only when the update header is set, the partial precision data is transmitted. Meanwhile, when the non-update header is set (FIG. 8B), and the initialization header is set (FIG. 8C), the partial precision data is not transmitted, and only data having a small size, such as a start-of-data marker, an end-of-data marker, a most significant bit (MSB) position, a least significant bit (LSB) position, or the like, is transmitted. Moreover, the start-of-data marker is a marker indicating the start of data, and the end-of-data marker is a marker indicating the end of data. Further, the most significant bit position is a data of the most significant bit position of the partial precision data having set therein the header, and the least significant bit position is data of the least significant bit position of the partial precision data having set therein the header.

Subsequently, Steps S16 to S21 described above will be described by way of an example.

As described above, at Step S16, the judgment is performed on the basis of the comparison of the partial precision data to be judged and the partial precision data transmitted to the liquid crystal projector 3 at the earlier time. Here, the description will be given by way of an example where the partial precision data shown in FIG. 4 is transmitted to the liquid crystal projector 3 during the previous frame (at the earlier time), and the partial precision data to be judged is as shown in FIG. 9.

Figure 9:
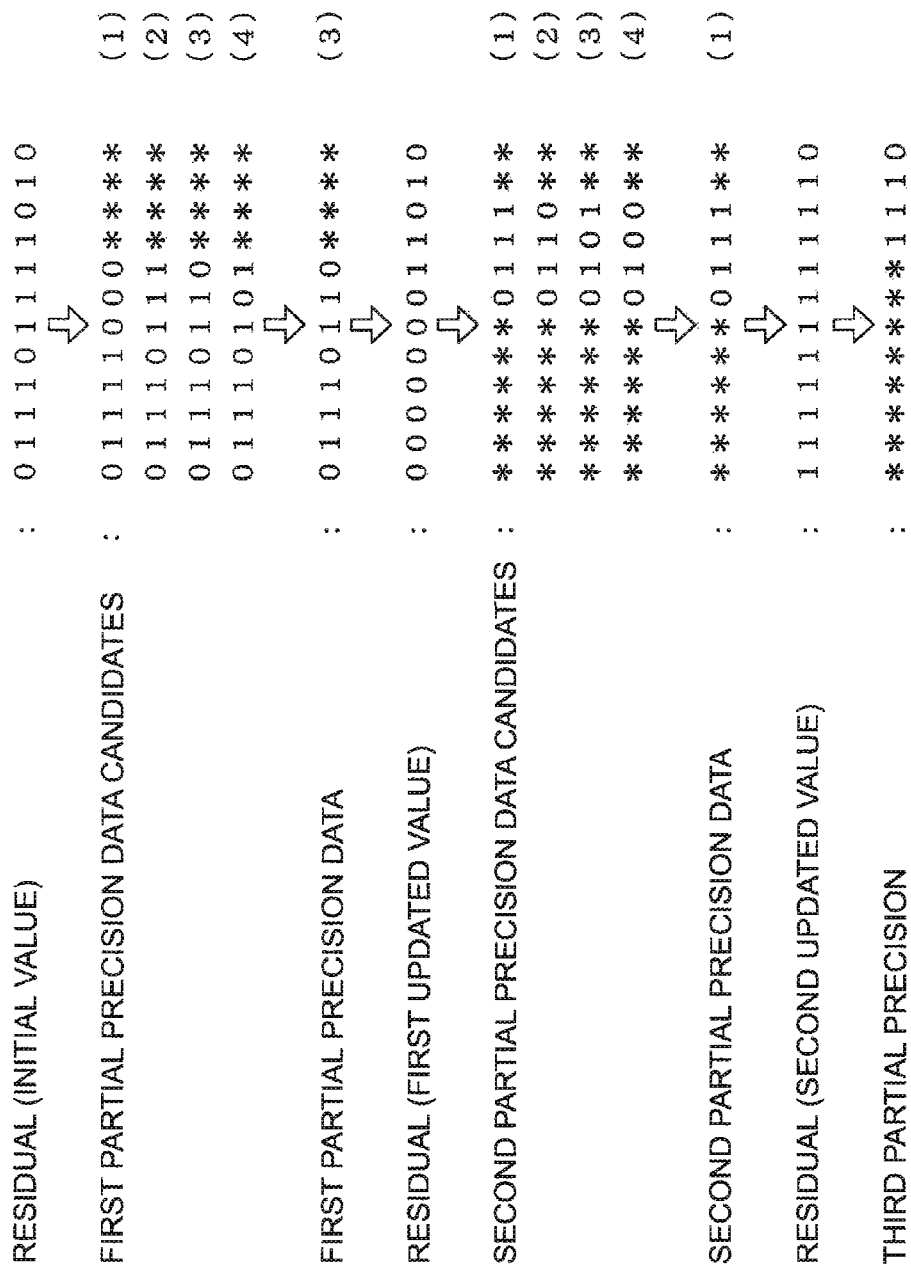
FIG. 9 is a diagram exemplarily showing partial precision data to be judged by a transmission data judging unit in the image display system according to the first embodiment of the invention.

In FIG. 9, upon the generation of the partial precision data, the correlation with the previous frame (FIG. 4) is considered. In the example of FIG. 9, the 12-bit pixel data, that is, the initial value of the residual is set to '011101111010'. Further, the division condition used for the partial precision data generation is the same as that in the example of FIG. 4.

Under this division condition, the first partial precision data is data of 8 bits from the MSB in the 12-bit pixel data, and becomes '01110111**' when simply cutting data of 8 bits. Here, under this division condition, since the first partial precision data and the second partial precision data overlap each other (2 bits), even though the first partial precision data is not set to the simply cut 8-bit data '01110111**', the original pixel data can be reproduced through the addition to the second partial precision data. As such, under the condition that reproducibility of the pixel data can be verified, as the first partial precision data, four candidates (1) to (4) shown in FIG. 9 are considered.

Moreover, although the value obtained by performing the rounding processing the initial value of the residual is used as the first partial precision data in the example of FIG. 4, from a different point of view, it can be seen that a candidate having the minimum residual (first updated value) among a plurality of first partial precision data candidates that are considered in the same manner as FIG. 9 is selected as the first partial precision data. Then, if the same reference is applied to FIG. 9, the candidate (1) is selected. However, since the candidate (1) is different from the first partial precision data of FIG. 4, it is judged at Step S16 that data is to be transmitted, and thus data transmission is required (Step S21).

Meanwhile, among the candidates (1) to (4) shown in FIG. 9, the candidate (3) that is the same as the first partial precision data of FIG. 4 is included. Then, if this candidate (3) is selected, it is judged at Step S16 that data is to be not transmitted, and thus data transmission is not required (Step S21). Accordingly, in view of reducing the amount of transmission data, in this embodiment, the candidate 3) is selected as the first partial precision data.

Subsequently, if the residual is updated by the selected first partial precision data (3), the residual becomes '000000011010'. In the same manner as described above, under this division condition, since the second partial precision data and the third partial precision data overlap each other (2 bits), as the second partial precision data that can verify reproducibility of the original pixel data, four candidates (1) to (4) shown in FIG. 9 are considered.

At this time, the second partial precision data may also be selected by the reference used for the selection of the first partial precision data. However, since one that is consistent with the second partial precision data of FIG. 4 is not included in the four candidates (1) to (4), even when any one is selected, data transmission is required. Accordingly, at this time, similarly to the example of FIG. 4, the candidate (1) having the minimum residual (second updated value) is selected as the second partial precision data.

As a result, '111111111110' is obtained as the final residual (second updated value). Accordingly, '********1110' is obtained as the third partial precision data.

With the comparison of FIG. 4 and FIG. 9, the first partial precision data and the third partial precision data are consistent with each other. Therefore, at Step S16, the transmission data judging unit 2231 judges that the first partial precision data and the third partial precision data are to be not transmitted (No) and, at Step S20, the non-update header is set. For this reason, as shown in FIG. 8B, at Step S21, the first partial precision data (8 bits) and the third partial precision data (4 bits) are not transmitted, and only data having a small size, such as the non-update header or the like, is transmitted.

Meanwhile, for the second partial precision data, FIG. 4 and FIG. 9 are different from each other. Accordingly, at Step S10, the transmission data judging unit 2231 judges that the second partial precision data is to be transmitted (Yes). Then, if it is judged at Step S17 that data is transmittable (Yes), the update header is set at Step S18. Therefore, as shown in FIG. 8A, at Step S21, the second partial precision data is transmitted together with the update header or the like.

As described above, since only the second partial precision data among the three partial precision data shown in FIG. 9 is actually transmitted, the amount of data to be transmitted through the USB cable 4 can be reduced.

Subsequently, returning to FIG. 2, a flow of image display at Step S21 and later will be described.

At Step S22, the USB controller 31 of the liquid crystal projector 3 receives data transmitted from the USB controller 24 of the personal computer 2 at Step S21.

At Step S23, the control unit 32 judges whether or not the update header is included in the data received at Step S22.

When the update header is included in the data received at Step S22 (Step S23: Yes), at Step S24, the control unit 32 updates the partial precision data of corresponding precision stored in the storage unit 33 by the partial precision data (see FIG. 8A) transmitted together with the update header.

When the update header is not included in the data received at Step S22 (Step S23: No), at Step S25, the control unit 32 judges whether or not the initialization header is included in the data.

Then the initialization header is included in the data received at Step S22 (Step S25: Yes), at Step S26, the control unit 32 refers to the initialization header (FIG. 8C) so as to initialize the partial precision data of corresponding precision stored in the storage unit 33.

At Step S25, when it is judged that the initialization header is not included in the received data (No), the non-update header is included in the received data, and, at Step S27, the control unit 32 refers to the non-update header (FIG. 8B) so as to leave the partial precision data of corresponding precision stored in the storage unit 33 non-updated.

In the above examples of FIG. 4 and FIG. 9, the update header is set in the second partial precision data, and the non-update header is set in the first and third partial precision data. For this reason, at Step S24, the second partial precision data stored in the storage unit 33 is updated by the second partial precision data '****0111' shown in FIG. 9. Meanwhile, for the first and third partial precision data, the update is not performed, and the data of the previous frame remain as they are (Step S27). However, since the first and third partial precision data in the previous frame shown in FIG. 4 and the first and third partial precision data FIG. 9 are consistent with each other, respectively, even though the update is not performed, the first and third partial precision data shown in FIG. 9 are stored in the storage unit 33, and thus it does not matter.

Subsequently, at Step S28, the data synthesizing unit 34 synthesizes partial precision data for the individual precisions stored in the storage unit 33. Accordingly, the original compensated image data divided by the partial precision data generating unit 222 of the personal computer 2 is reproduced (see FIG. 7).

At Step S29, the liquid crystal panel driving device 35 drives the liquid crystal panel 36 on the basis of the image data synthesized at Step S28, and causes the liquid crystal panel 36 to display the image based on the image data. Then, the projection optical device 37 projects the image displayed by the liquid crystal panel 36 on the screen 5 on a magnified scale.

5. Effects of Embodiment

According to the image display system 1 of this embodiment, the partial precision data judged by the transmission data judging unit 2231 of the personal computer 2 as one to be not transmitted (Step S16: No) may not be transmitted to the liquid crystal projector 3 (see FIG. 8B). Accordingly, the amount of data to be transmitted from the personal computer 2 to the liquid crystal projector 3 through the USB cable 4 can be reduced, and the transmission can be appropriately performed. As a result, it is possible to prevent the quality of the image to be displayed by the liquid crystal projector 3 from being degraded.

According to the image display system 1 of this embodiment, it is judged by the transmission data judging unit 2231 that the changed partial precision data from the corresponding partial precision data at the earlier time is to be transmitted (Step S16: Yes). Therefore, the amount of data to be transmitted from the personal computer 2 to the liquid crystal projector 3 through the USB cable 4 can be reduced, and the transmission can be appropriately performed.

According to the image display system 1 of this embodiment, for the partial precision data judged by the transmission data judging unit 2231 as one to be not transmitted (Step S16: No), the non-update header having a small size purporting that the partial precision data is to be not updated is transmitted, and the partial precision data having a large size is not transmitted (see FIG. 5B). Therefore, the amount of data to be transmitted from the personal computer 2 to the liquid crystal projector 3 through the USE cable 4 can be reduced, and the transmission can be appropriately performed.

According to the image display system 1 of this embodiment, on the basis of the result (Step S17) of the judgment performed by the transmission capability judging unit 2232, the maximum partial precision data in an acceptable range can be transmitted to the liquid crystal projector 3 in consideration of the actual status, such as the status of the USE cable 4 (whether or not congestion occurs) or the like, and an image of the maximum precision can be displayed in consideration of the actual status.

According to the image display system 1 of this embodiment, for the partial precision data judged by the transmission data judging unit 2231 as one to be transmitted (Step S16: Yes) and judged by the transmission capability judging unit 2232 as a non-transmittable one (Step S17: No), the initialization header is set (Step S19), and the initialization header is transmitted to the liquid crystal projector 3 instead of the partial precision data. Then, the corresponding partial precision data stored in the storage unit 33 is initialized. According to this configuration, even when the partial precision data is not transmitted, and the partial precision data stored in the storage unit 33 of the liquid crystal projector 3 cannot be updated, the partial precision data can be initialized. Accordingly, it is possible to prevent at least the partial precision data at the earlier time (partial precision data to be originally updated by newly transmitted partial precision data) from being used for the synthesis of the image data, and thus to prevent precision of the image from being degraded.

According to the image display system 1 of this embodiment, the transmission capability judging unit 2232 judges that first partial precision data representing the main portion of the image among the three partial precision data generated by the partial precision data generating unit 222 can be transmitted than the second and third partial precision data (Step S17: Yes), and the first partial precision data is preferentially transmitted to the liquid crystal projector 3. Therefore, at least the main portion of the image can be displayed on the liquid crystal projector 3, and the minimum image precision can be verified.

6. Modifications

Moreover, in this embodiment, the data of 8 bits from the MSB of the 12-bit compensated image data is generated as the first partial precision data serving as the main partial precision data, but a method of generating the main partial precision data is not limited thereto.

For example, since it can be expected that, between temporally adjacent frames, the main portions are common, it is reasonable to use average data of the frames as the main partial precision data. Specifically, when a plurality of frames to be displayed on the liquid crystal projector 3 can be foreseen in the personal computer 2, average data of the plurality of foreseen frames can be generated as the main partial precision data. Further, when the frames cannot be foreseen in the personal computer 2, average data of the plurality of previous frames transmitted to the liquid crystal projector 3 already may be generated as the main partial precision data.

As such, if the main partial precision data appropriately representing the main portion of the image is generated, the common main portion in temporally adjacent frames can be appropriately removed from the second and later partial precision data, and thus the amount of data can be reduced.

In this embodiment, in the initial condition of division of the partial precision data set at Step S6, the division bit width W is set to a value other than 0 (zero), but the bit width W may be set to 0 (zero) when the initial value of the bit width W is set to 0 (zero), through Step S12, the bit width (initial value 0) of the partial precision data sequentially extends until the residual can be represented, and the bit width is defined at a time at which the residual can be represented. In this case, since the bit width of the partial precision data has the minimum value for representing the residual through Step S12, the amount of data can be reduced.

In this embodiment, the liquid crystal projector 3 is provided as an image display device, but, in addition to the liquid crystal projector 3, various displays (liquid crystal displays, plasma displays, CRT displays, or organic EL displays) may be provided as an image display device.

In this embodiment, the personal computer 2 serving as a data processing device and the liquid crystal projector 3 serving as an image display device are connected by the USE cable 4 serving as a transmission path, but the transmission path is not limited to the USB cable. In addition to the USB cable, various transmission cables or networks may be used as a transmission path.

Second Embodiment

A second embodiment of the invention will now be described.

The descriptions of the features common to the first embodiment will be omitted or simplified. In particular, the same parts as those of the first embodiment are represented by the same reference numerals, and the descriptions thereof will be omitted or simplified.

In this embodiment, the image data input by the image data input unit 21 is encrypted by an MPEG system. The partial precision data generating unit 222 generates partial precision data using a GOP structure that is a unit of image compression in the MPEG system.

Figure 10:
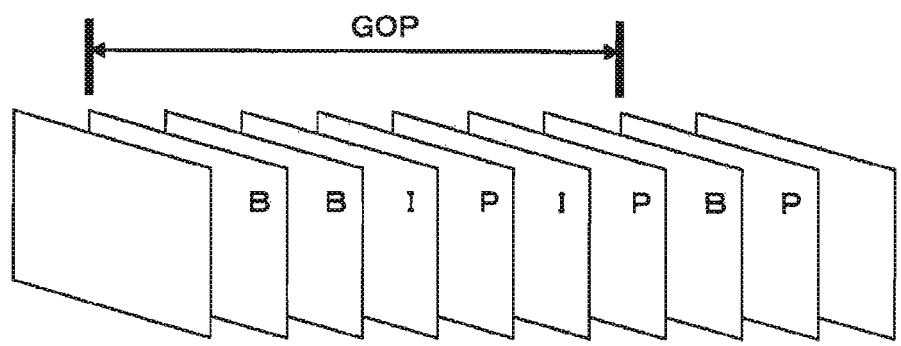
FIG. 10 is a diagram schematically showing image data encrypted by an MPEG system in an image display system according to a second embodiment of the invention.

FIG. 10 is a diagram schematically showing image data encrypted by the MPEG system.

As shown in the drawing, the GOP includes a group of pictures having three pictures of the I picture, the P picture, and the B picture. As described above, the I picture is a picture that can be self-reproduced, the P picture is a picture that can be reproduced with reference to a picture at the earlier time, and the B picture is a picture that can be reproduced with reference to pictures at the earlier time and later time. Here, the P picture and the B picture are pictures that can be reproduced with reference other pictures, but the pictures to be referred to are limited to other pictures in the GOP structure, to which the pictures to be referred belong. As such, since the reference relationship between the pictures in the GOP structure is closed, the pictures belonging to the same GOP have many similar and common portions.

Here, the similar and common portions between the pictures belonging to the same GOP constitute the main portion in a series of pictures represented by the GOP. Accordingly, in this embodiment, the partial precision data generating unit 222 averages the pictures belonging to the same GOP so as to extract only the similar and common portions, and sets that as the first partial precision data serving as the main partial precision data. Moreover, like the first embodiment, the second and later partial precision data serving as the detailed partial precision data is sequentially generated on the basis of differential data generated by subtracting the first partial precision data from the original image data.

As described above, since the first partial precision data having high commonality between the pictures belonging to the same GOP is set, the size of the second and later partial precision data generated by subtracting the first partial precision data from the compensated image data can be reduced. Therefore, according to this embodiment, the amount of data to be transmitted through the USB cable 4 can be reduced.

Since the first partial precision data as the average data of the pictures belonging to the same GOP is common to the individual pictures belonging to the GOP, once the data is transmitted to the liquid crystal projector 3, it is unnecessary to retransmit the data during the pictures belonging to the same GOP are displayed, and thus the amount of data to be transmitted through the USB cable 4 can be reduced.

Third Embodiment

A third embodiment of the invention will now be described.

The descriptions of the features common to the first and second embodiments will be omitted or simplified. In particular, the same parts as those in the first and second embodiments are represented by the same reference numerals, and the descriptions thereof will be omitted or simplified.

In this embodiment, spatial frequency transform is executed on the image data input by the image data input unit 21 in advance. Here, the spatial frequency transform transforms the image data into individual spatial frequency components, and, for example, DCT (Discrete Cosine Transform), Fourier transform, Hadamard transform, and wavelet transform may be exemplified. Hereinafter, in this embodiment, an example where the DCT is used will be described.

Figure 11:
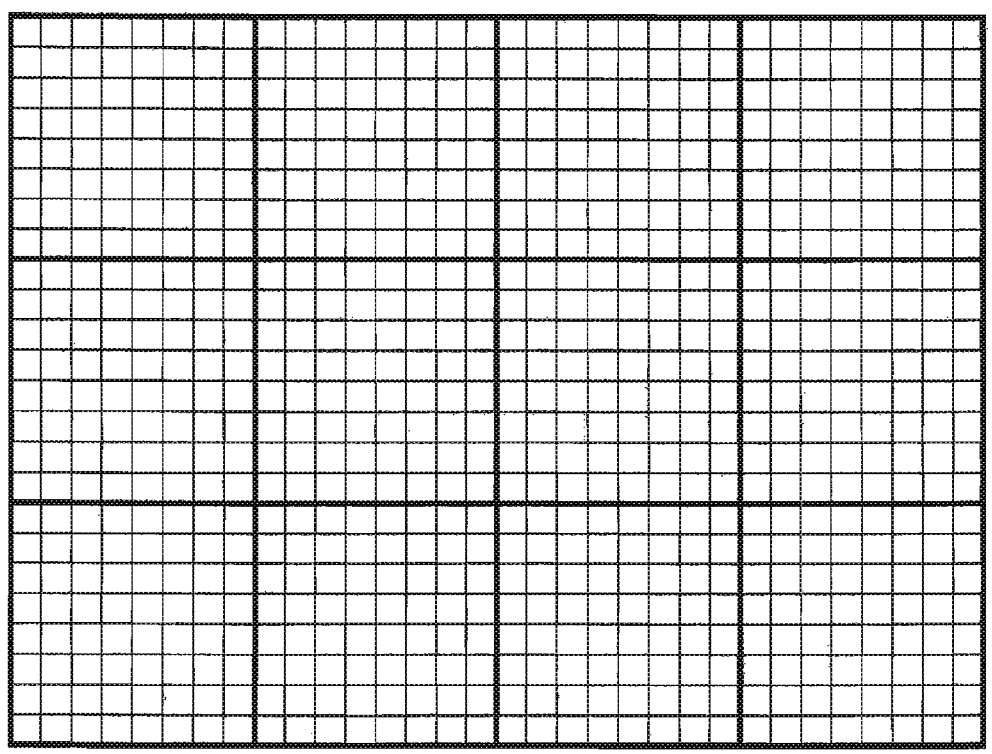
FIG. 11 is a diagram schematically showing an example of block division of image data, which is performed when DCT is performed on the image data, in an image display system according to a third embodiment of the invention.

FIG. 11 is a diagram schematically showing an example of block division of the image data that is performed when the DCT is executed on the image data. In the drawing, small squares individually represent the pixels forming the image, and the image is formed by 24×32 pixels. Then, in order to execute the DCT on the image data, the image data is divided into blocks 12 having 8×8 pixels (a large square indicated by a solid frame. Hereinafter, it is referred to as 8×8 block). The DCT is executed for each 8×8 block.

Figure 12:
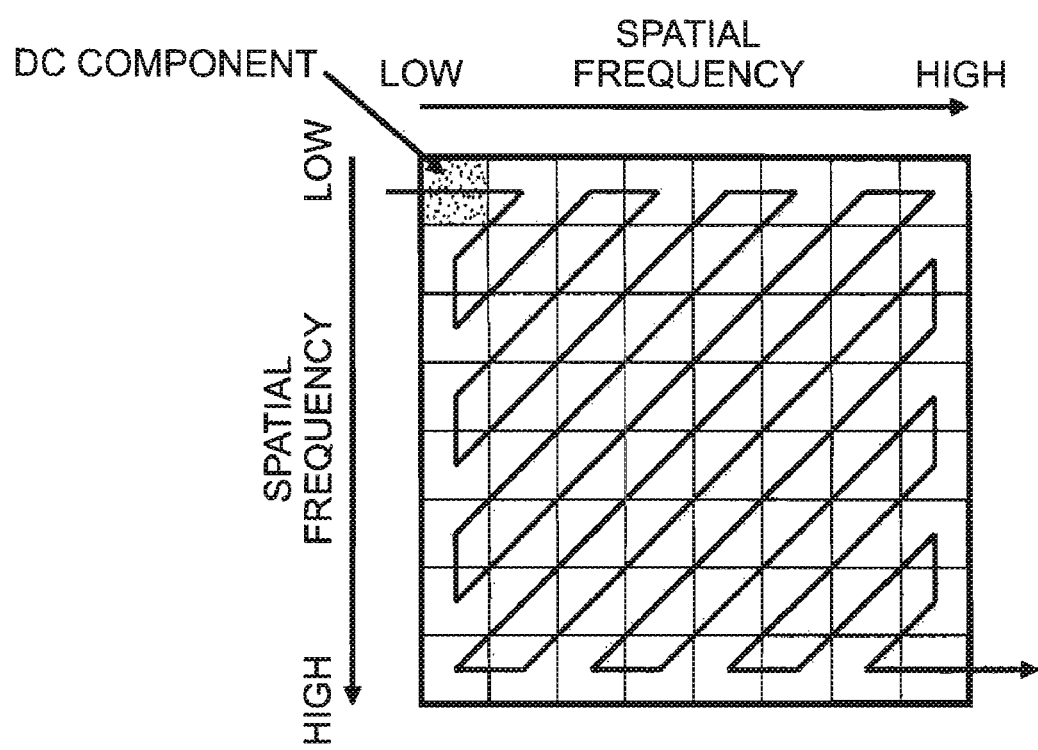
FIG. 12 is a diagram schematically showing individual spatial frequency components, which are generated by performing the DCT on one 8×8 block, in the image display system according to the third embodiment of the invention.

FIG. 12 is a diagram schematically showing the individual spatial frequency components generated by executing the DCT on one 8×8 block. As shown in FIG. 12, if the DCT is executed on the 8×8 block, 8×8 spatial frequency components are generated. In FIG. 12, an upper left spatial frequency component is a normal component (DC component), and spatial frequency components corresponding high spatial frequencies are sequentially arranged as being distant from the normal component. Here, the normal component is an average value of the pixels in the 8×8 block (FIG. 11), particularly, before the DCT.

In this embodiment, the partial precision data generating unit 222 generates divides the image data on the basis of the individual spatial frequency components (FIG. 12) obtained by executing the DCT on the image data so as to generate the partial precision data. This is different from the first embodiment, in which the image data is divided as the bit data so as to generate the partial precision data. Specifically, the partial precision data generating unit 222 generates the normal component obtained by the DCT as the first partial precision data serving as the main partial precision data. For this reason, in the example of FIG. 11 where the number of 8×8 blocks as a DCT execution unit is 3×4, the first partial precision data is formed by 3×4 normal components in total by one per block.

The second and later partial precision data as the detailed partial precision data are generated on the basis of the individual spatial frequency component (differential data), other than the normal component, among the 8×8 spatial frequency components. At this time, one spatial frequency component may be set as the partial precision data as it is or a plurality of spatial frequency components may be combined so as to generate one partial precision data.

Here, the second and later partial precision data are preferably generated from one representing an important portion of the image. In general, since a low spatial frequency component, not a high spatial frequency component, represents the important portion of the image, for example, the second partial precision data is generated on the basis of the low spatial frequency component, and then the third spatial frequency component, the fourth spatial frequency component, . . . are generated in that order, and then the partial precision data is generated on the basis of the high spatial frequency component. Moreover, the judgment sequence of transmission capability in the transmission capability judging unit 2232 is the same as that in the first embodiment (first partial precision data→second partial precision data→ . . . ).

As described above, in this embodiment, since the normal component having the minimum variation among the individual spatial frequency components generated by executing the DCT on the image data is used as the first partial precision data, the first partial precision data having high reusability can be obtained. As a result, the amount of data to be transmitted through the USB cable 4 can be reduced.

FIGS. 13A to 13C are diagrams showing data that is transmitted from the personal computer 2 to the liquid crystal protector 3 through the USB cable 4 in this embodiment. As will be apparent through the comparison with FIGS. 8A to 8C of the first embodiment, in this embodiment, 'low-frequency data position', 'high-frequency data position', 'resolution power X', and 'resolution power Y' are added to the transmission data. Here, the low-frequency data position and the high-frequency data position are data corresponding to the most significant bit position and the least significant bit position in the first embodiment, and defines a division range of the partial precision data. Specifically, in FIG. 12, the low-frequency data position or the high-frequency data position is data indicating what number the spatial frequency component is from the DC component (the minimum spatial frequency component) along an arrow in the drawing. The partial precision data is generated by a spatial frequency component between the low-frequency data position and the high-frequency data position. Further, the resolution power X and the resolution power Y are the numbers of pixels in vertical and horizontal directions of the block (FIG. 11), on which the DCT is executed. In this embodiment, X=8 and Y=8.

When the data about the data position and the resolution power are included in the transmission data to the liquid crystal projector 3, the data synthesizing unit 34 of the liquid crystal projector 3 can recognize into which block the image data is divided and then whether or not the DCT is executed, and can accurately reproduce the image data before the DCT.

In this embodiment, the spatial frequency transform (DCT) is executed on the image data input by the mage data input unit 21 in advance, but the partial precision data generating unit 222 may perform the spatial frequency transform on the image data, which is not subject to the spatial frequency transform, from the image data input unit 21.

In this embodiment, the image data is divided into the 8×8 block and the DCT is executed, but the image data may be divided into 16×8, 8×16, or 16×16 block and then the spatial frequency transform may be executed.

Fourth Embodiment

A fourth embodiment of the invention will now be described.

The descriptions of the features common to the first to third embodiments will be omitted or simplified. In particular, the same parts as those in the first to third embodiments are represented by the same reference numerals, and the descriptions thereof will be omitted or simplified.

Figure 14:
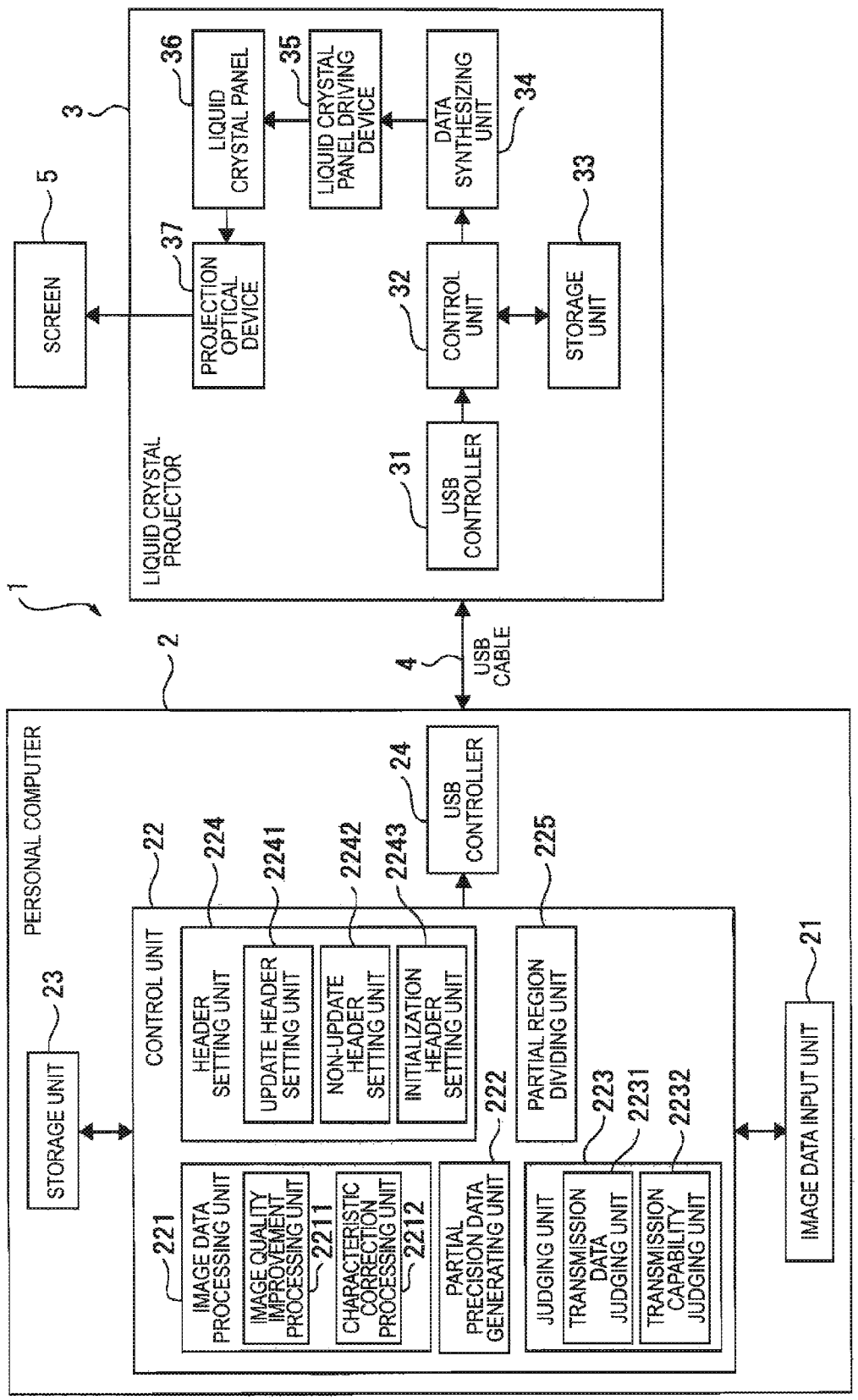
FIG. 14 is a functional block diagram showing the configuration of an image display system according to a fourth embodiment of the invention.

FIG. 14 is a functional block diagram showing the configuration of an image display system 1 according to a fourth embodiment of the invention.

The image display system according to the fourth embodiment is different from the image display system 1 according to the first embodiment shown in FIG. 1 in that a partial region dividing unit 225 is provided in the control unit 22 of the personal computer 2.

The partial region dividing unit 225 is a functional unit that divides the image data input from the image data input unit 21 to the control unit 22 into a plurality of partial regions. In particular, the partial region dividing unit 225 divides the compensated image data into the partial regions, prior to the generation processing of the partial precision data in the partial precision data generating unit 222. The partial precision data generating unit 222 generates partial precision data for each divided partial region. Subsequently, the processing in the personal computer 2 and the liquid crystal projector 3 (for example, the processing in the first to third embodiments) is executed for each divided partial region by the partial region dividing unit 225.

In this embodiment, it is assumed that the partial region dividing unit 225 divides the image data into rectangular partial regions. The division condition at this time may be set by four numerical values of the coordinate X and Y of the origin of the partial region and the width and height of the partial region. Then, as shown in FIGS. 15A to 15C, the four numerical values 'region origin X', 'region origin Y', 'region width', and 'region height' are added to the data to be transmitted from the personal computer 2 to the liquid crystal projector 3 through the USB cable 4. The data synthesizing unit 34 of the liquid crystal projector 3 can recognize into which partial region the image data is divided, and partial region division image data can be accurately reproduced. Moreover, in FIGS. 15A to 15C, parenthesized data represents data that is transmitted when the processing in the third embodiment is performed.

The image display system 1 of this embodiment is suitable, in particular, for processing image data including a partial region having a small temporal change. That is, in the partial region having the small temporal change, a temporal change of the partial precision data is also small, and thus reusability of the partial precision data increases. For this reason, the number of transmission times of the update partial precision data from the personal computer 2 to the liquid crystal protector 3 can be reduced. Therefore, the amount of data to be transmitted through the USB cable 4 can be reduced.

The invention can be used for an image display system.

The entire disclosure of Japanese Patent Application No. 2005-260262, filed Sep. 8, 2005 is expressly incorporated by reference herein.

What is claimed is:

1. An image display system comprising:
a data processing device that processes image data;
an image display device that displays an image on the basis of the image data processed by the data processing device; and
a transmission path that transmits data between the data processing device and the image display device,
wherein the data processing device includes:
an image data processing unit that performs a predetermined compensation processing on the image data so as to generate compensated image data,
a partial precision data generating unit that divides a pixel of the compensated image data into a plurality of partial precision data according to precisions, the plurality of partial precision data including partial precision data of at least two different levels of precision,
a transmission data judging unit that judges, for each of the plurality of partial precision data, whether each of the partial precision data are to be transmitted, and
a transmitting unit that transmits the partial precision data judged by the transmission data judging unit as one to be transmitted through the transmission path, and
wherein the image display device includes:
a receiving unit that receives the partial precision data transmitted from the transmitting unit through the transmission path,
a storage unit that stores the partial precision data received by the receiving unit,
a data synthesizing unit that synthesizes the partial precision data for the individual precisions stored in the storage unit, and
an image display unit that displays image data synthesized by the data synthesizing unit.

2. The image display system according to claim 1,
wherein the transmission data judging unit compares partial precision data to be judged and corresponding partial precision data at an earlier time, and, when both are inconsistent with each other, judges that the partial precision data is to be transmitted, and, when both are consistent with each other, judges that the partial precision data is to be not transmitted.

3. The image display system according to claim 1,
wherein the data processing device includes a non-update data setting unit that sets non-update data corresponding to the partial precision data judged by the transmission data judging unit as one to be not transmitted among the plurality of partial precision data generated by the partial precision data generating unit,
the transmitting unit transmits the non-update data through the transmission path,
the receiving unit receives the non-update data transmitted from the transmitting unit through the transmission path, and
the storage unit refers to the non-update data received by the receiving unit so as not to perform update of the partial precision data corresponding to the non-update data stored in the storage unit.

4. The image display system according to claim 1,
wherein the data processing device includes a transmission capability judging unit that judges whether or not the partial precision data judged by the transmission data judging unit as one to be transmitted can be actually transmitted through the transmission path,
the transmitting unit transmits the partial precision data judged by the transmission capability judging unit as a transmittable one through the transmission path.

5. The image display system according to claim 4,
wherein the data processing device includes an initialization data setting unit that sets initialization data corresponding to partial precision data judged by the transmission capability judging unit as a non-transmittable among the plurality of partial precision data generated by the partial precision data generating unit, the transmitting unit transmits the initialization data through the transmission path, the receiving unit receives the initialization data transmitted from the transmitting unit through the transmission path, and the storage unit refers to the initialization data received by the receiving unit so as to initialize partial precision data corresponding to the initialization data stored in the storage unit.

6. The image display system according to claim 4,
wherein the partial precision data generating unit divides the compensated image data into one main partial precision data that can represent a main portion in the image, and at least one detailed partial precision data that is generated on the basis of differential data obtained by subtracting the main partial precision data from the compensated image data and is synthesized with the main partial precision data so as to represent a detailed portion in the image, and the transmission capability judging unit preferentially judges the main partial precision data over the detailed partial precision data as a transmittable one among the plurality of partial precision data generated by the partial precision data generating unit.

7. The image display system according to claim 6,
wherein the main partial precision data is generated as data of a predetermined number of bits from a most significant bit in the compensated image data expressed by bits.

8. The image display system according to claim 6,
wherein the main partial precision data is generated on the basis of individual pictures included in a GOP structure in the compensated image data encrypted by an MPEG system.

9. The image display system according to claim 6,
wherein the main partial precision data is generated as a normal component among individual spatial frequency components obtained by performing spatial frequency transform on the compensated image data.

10. The image display system according to claim 1,
wherein the data processing device includes a partial region dividing unit that divides the compensated image data into a plurality of partial regions, and the processing in the data processing device and the image display device are performed for each partial region.

11. An image display method comprising:
performing, with a data processing device, a predetermined compensation processing on image data so as to generate compensated image data, dividing, with the data processing device, a pixel of the compensated image data into a plurality of partial precision data according to precisions, the plurality of partial precision data including partial precision data of at least two different levels of precision, judging, with the data processing device, for each of the plurality of partial precision data, whether each of the partial precision data are to be transmitted, transmitting, via a transmission path, the partial precision data judged in the judging as one to be transmitted through the transmission path, receiving, in an image display device, the partial precision data transmitted through the transmission path in the transmitting, storing, in the image display device, the partial precision data received in the receiving, synthesizing, in the image display device, partial precision data for the individual precisions stored in the storing, and displaying image data synthesized in the synthesizing on the image display device.

12. A non-transitory computer readable storage medium storing an image display program that uses an image display system including a data processing device that processes image data, an image display device that displays an image on the basis of the image data processed by the data processing device, and a transmission path that transmits data between the data processing device and the image display device, the image display program causing a computer provided in the data processing device to execute:

performing a predetermined compensation processing on the image data so as to generate compensated image data, dividing a pixel of the compensated image data into a plurality of partial precision data according to precisions, the plurality of partial precision data including partial precision data of at least two different levels of precision, judging, for each of the plurality of partial precision data, whether each of the partial precision data are to be transmitted, and transmitting the partial precision data judged in the judging as one to be transmitted through the transmission path, and the image display program causing a computer provided in the image display device to execute:

receiving the partial precision data transmitted in the transmitting through the transmission path, storing the partial precision data received in the receiving, synthesizing the partial precision data for the individual precisions stored in the storing, and displaying image data synthesized in the synthesizing.

* * * * *